US009430958B2

(12) United States Patent
Chaji et al.

(10) Patent No.: US 9,430,958 B2
(45) Date of Patent: *Aug. 30, 2016

(54) SYSTEM AND METHODS FOR EXTRACTING CORRELATION CURVES FOR AN ORGANIC LIGHT EMITTING DEVICE

(71) Applicant: Ignis Innovation Inc., Waterloo (CA)

(72) Inventors: Gholamreza Chaji, Waterloo (CA); Javid Jaffari, Kitchener (CA); Arokia Nathan, Cambridge (GB)

(73) Assignee: Ignis Innovation Inc., Waterloo, Ontario (CA)

( * ) Notice: Subject to any disclaimer, the term of this patent is extended or adjusted under 35 U.S.C. 154(b) by 338 days.

This patent is subject to a terminal disclaimer.

(21) Appl. No.: 14/027,811

(22) Filed: Sep. 16, 2013

(65) Prior Publication Data

US 2014/0015824 A1 Jan. 16, 2014

Related U.S. Application Data

(63) Continuation of application No. 13/020,252, filed on Feb. 3, 2011, now Pat. No. 8,589,100.

(30) Foreign Application Priority Data

Feb. 4, 2010 (CA) ..................................... 2692097

(51) Int. Cl.

| | |
|---|---|
| ***G06F 3/038*** | (2013.01) |
| ***G09G 3/00*** | (2006.01) |
| ***G09G 3/32*** | (2016.01) |

(52) U.S. Cl.

CPC ................ *G09G 3/006* (2013.01); *G09G 3/32* (2013.01); *G09G 3/3258* (2013.01); (Continued)

(58) Field of Classification Search

CPC ..................... G09G 3/3233; G09G 2300/089; G09G 2360/145; G09G 2360/16; G09G 2320/045

See application file for complete search history.

(56) References Cited

U.S. PATENT DOCUMENTS

| | | | |
|---|---|---|---|
| 3,506,851 | A | 4/1970 | Polkinghorn et al. |
| 3,774,055 | A | 11/1973 | Bapat et al. |

(Continued)

FOREIGN PATENT DOCUMENTS

| | | |
|---|---|---|
| CA | 1 294 034 | 1/1992 |
| CA | 2 109 951 | 11/1992 |

(Continued)

OTHER PUBLICATIONS

Japanese Office Action for Japanese Application No. 2012-551728, mailed Jan. 6, 2015, with English language translation, 11 pages.

(Continued)

*Primary Examiner* — Elias Desta

(74) *Attorney, Agent, or Firm* — Nixon Peabody LLP

(57) ABSTRACT

A system and method for determining and applying characterization correlation curves for aging effects on an organic light organic light emitting device (OLED) based pixel is disclosed. A first stress condition is applied to a reference pixel having a drive transistor and an OLED. An output voltage based on a reference current is measured periodically to determine an electrical characteristic of the reference pixel under the first predetermined stress condition. The luminance of the reference pixel is measured periodically to determine an optical characteristic of the reference pixel. A characterization correlation curve corresponding to the first stress condition including the determined electrical and optical characteristic of the reference pixel is stored. The stress condition of an active pixel is determined and a compensation voltage is determined by correlating the stress condition of the active pixel with curves of the predetermined stress conditions.

21 Claims, 4 Drawing Sheets

(52) U.S. Cl.
CPC ... *G09G 3/3291* (2013.01); *G09G 2300/0413* (2013.01); *G09G 2320/029* (2013.01); *G09G 2320/0285* (2013.01); *G09G 2320/043* (2013.01); *G09G 2360/145* (2013.01)

(56) References Cited

U.S. PATENT DOCUMENTS 4,090,096 A 5/1978 Nagami
4,160,934 A 7/1979 Kirsch
4,354,162 A 10/1982 Wright
4,943,956 A 7/1990 Noro
4,996,523 A 2/1991 Bell et al.
5,153,420 A 10/1992 Hack et al.
5,198,803 A 3/1993 Shie et al.
5,204,661 A 4/1993 Hack et al.
5,266,515 A 11/1993 Robb et al.
5,489,918 A 2/1996 Mosier
5,498,880 A 3/1996 Lee et al.
5,572,444 A 11/1996 Lentz et al.
5,589,847 A 12/1996 Lewis
5,619,033 A 4/1997 Weisfield
5,648,276 A 7/1997 Hara et al.
5,670,973 A 9/1997 Bassetti et al.
5,691,783 A 11/1997 Numao et al.
5,714,968 A 2/1998 Ikeda
5,723,950 A 3/1998 Wei et al.
5,744,824 A 4/1998 Kousai et al.
5,745,660 A 4/1998 Kolpatzik et al.
5,748,160 A 5/1998 Shieh et al.
5,815,303 A 9/1998 Berlin
5,870,071 A 2/1999 Kawahata
5,874,803 A 2/1999 Garbuzov et al.
5,880,582 A 3/1999 Sawada
5,903,248 A 5/1999 Irwin
5,917,280 A 6/1999 Burrows et al.
5,923,794 A 7/1999 McGrath et al.
5,945,972 A 8/1999 Okumura et al.
5,949,398 A 9/1999 Kim
5,952,789 A 9/1999 Stewart et al.
5,952,991 A 9/1999 Akiyama et al.
5,982,104 A 11/1999 Sasaki et al.
5,990,629 A 11/1999 Yamada et al.
6,023,259 A 2/2000 Howard et al.
6,069,365 A 5/2000 Chow et al.
6,091,203 A 7/2000 Kawashima et al.
6,097,360 A 8/2000 Holloman
6,144,222 A 11/2000 Ho
6,177,915 B1 1/2001 Beeteson et al.
6,229,506 B1 5/2001 Dawson et al.
6,229,508 B1 5/2001 Kane
6,246,180 B1 6/2001 Nishigaki
6,252,248 B1 6/2001 Sano et al.
6,259,424 B1 7/2001 Kurogane
6,262,589 B1 7/2001 Tamukai
6,271,825 B1 8/2001 Greene et al.
6,288,696 B1 9/2001 Holloman
6,304,039 B1 10/2001 Appelberg et al.
6,307,322 B1 10/2001 Dawson et al.
6,310,962 B1 10/2001 Chung et al.
6,320,325 B1 11/2001 Cok et al.
6,323,631 B1 11/2001 Juang
6,356,029 B1 3/2002 Hunter
6,373,454 B1 4/2002 Knapp et al.
6,392,617 B1 5/2002 Gleason
6,414,661 B1 7/2002 Shen et al.
6,417,825 B1 7/2002 Stewart et al.
6,433,488 B1 8/2002 Bu
6,437,106 B1 8/2002 Stoner et al.
6,445,369 B1 9/2002 Yang et al.
6,475,845 B2 11/2002 Kimura
6,501,098 B2 12/2002 Yamazaki
6,501,466 B1 12/2002 Yamagishi et al.
6,522,315 B2 2/2003 Ozawa et al.
6,525,683 B1 2/2003 Gu
6,531,827 B2 3/2003 Kawashima
6,542,138 B1 4/2003 Shannon et al.
6,580,408 B1 6/2003 Bae et al.
6,580,657 B2 6/2003 Sanford et al.
6,583,398 B2 6/2003 Harkin
6,583,775 B1 6/2003 Sekiya et al.
6,594,606 B2 7/2003 Everitt
6,618,030 B2 9/2003 Kane et al.
6,639,244 B1 10/2003 Yamazaki et al.
6,668,645 B1 12/2003 Gilmour et al.
6,677,713 B1 1/2004 Sung
6,680,580 B1 1/2004 Sung
6,687,266 B1 2/2004 Ma et al.
6,690,000 B1 2/2004 Muramatsu et al.
6,690,344 B1 2/2004 Takeuchi et al.
6,693,388 B2 2/2004 Oomura
6,693,610 B2 2/2004 Shannon et al.
6,697,057 B2 2/2004 Koyama et al.
6,720,942 B2 4/2004 Lee et al.
6,724,151 B2 4/2004 Yoo
6,734,636 B2 5/2004 Sanford et al.
6,738,034 B2 5/2004 Kaneko et al.
6,738,035 B1 5/2004 Fan
6,753,655 B2 6/2004 Shih et al.
6,753,834 B2 6/2004 Mikami et al.
6,756,741 B2 6/2004 Li
6,756,952 B1 6/2004 Decaux et al.
6,756,985 B1 6/2004 Hirotsune et al.
6,771,028 B1 8/2004 Winters
6,777,712 B2 8/2004 Sanford et al.
6,777,888 B2 8/2004 Kondo
6,781,567 B2 8/2004 Kimura
6,806,497 B2 10/2004 Jo
6,806,638 B2 10/2004 Lin et al.
6,806,857 B2 10/2004 Sempel et al.
6,809,706 B2 10/2004 Shimoda
6,815,975 B2 11/2004 Nara et al.
6,828,950 B2 12/2004 Koyama
6,853,371 B2 2/2005 Miyajima et al.
6,859,193 B1 2/2005 Yumoto
6,873,117 B2 3/2005 Ishizuka
6,876,346 B2 4/2005 Anzai et al.
6,885,356 B2 4/2005 Hashimoto
6,900,485 B2 5/2005 Lee
6,903,734 B2 6/2005 Eu
6,909,243 B2 6/2005 Inukai
6,909,419 B2 6/2005 Zavracky et al.
6,911,960 B1 6/2005 Yokoyama
6,911,964 B2 6/2005 Lee et al.
6,914,448 B2 7/2005 Jinno
6,919,871 B2 7/2005 Kwon
6,924,602 B2 8/2005 Komiya
6,937,215 B2 8/2005 Lo
6,937,220 B2 8/2005 Kitaura et al.
6,940,214 B1 9/2005 Komiya et al.
6,943,500 B2 9/2005 LeChevalier
6,947,022 B2 9/2005 McCartney
6,954,194 B2 10/2005 Matsumoto et al.
6,956,547 B2 10/2005 Bae et al.
6,975,142 B2 12/2005 Azami et al.
6,975,332 B2 12/2005 Arnold et al.
6,995,510 B2 2/2006 Murakami et al.
6,995,519 B2 2/2006 Arnold et al.
7,023,408 B2 4/2006 Chen et al.
7,027,015 B2 4/2006 Booth, Jr. et al.
7,027,078 B2 4/2006 Reihl
7,034,793 B2 4/2006 Sekiya et al.
7,038,392 B2 5/2006 Libsch et al.
7,057,359 B2 6/2006 Hung et al.
7,061,451 B2 6/2006 Kimura
7,064,733 B2 6/2006 Cok et al.
7,071,932 B2 7/2006 Libsch et al.
7,088,051 B1 8/2006 Cok
7,088,052 B2 8/2006 Kimura
7,102,378 B2 9/2006 Kuo et al.
7,106,285 B2 9/2006 Naugler
7,112,820 B2 9/2006 Change et al.
7,116,058 B2 10/2006 Lo et al.
7,119,493 B2 10/2006 Fryer et al.
7,122,835 B1 10/2006 Ikeda et al.

(56) References Cited

U.S. PATENT DOCUMENTS 7,127,380 B1 10/2006 Iverson et al.
7,129,914 B2 10/2006 Knapp et al.
7,164,417 B2 1/2007 Cok
7,193,589 B2 3/2007 Yoshida et al.
7,224,332 B2 5/2007 Cok
7,227,519 B1 6/2007 Kawase et al.
7,245,277 B2 7/2007 Ishizuka
7,248,236 B2 7/2007 Nathan et al.
7,262,753 B2 8/2007 Tanghe et al.
7,274,363 B2 9/2007 Ishizuka et al.
7,310,092 B2 12/2007 Imamura
7,315,295 B2 1/2008 Kimura
7,321,348 B2 1/2008 Cok et al.
7,339,560 B2 3/2008 Sun
7,355,574 B1 4/2008 Leon et al.
7,358,941 B2 4/2008 Ono et al.
7,368,868 B2 5/2008 Sakamoto
7,411,571 B2 8/2008 Huh
7,414,600 B2 8/2008 Nathan et al.
7,423,617 B2 9/2008 Giraldo et al.
7,474,285 B2 1/2009 Kimura
7,502,000 B2 3/2009 Yuki et al.
7,528,812 B2 5/2009 Tsuge et al.
7,535,449 B2 5/2009 Miyazawa
7,554,512 B2 6/2009 Steer
7,569,849 B2 8/2009 Nathan et al.
7,576,718 B2 8/2009 Miyazawa
7,580,012 B2 8/2009 Kim et al.
7,589,707 B2 9/2009 Chou
7,609,239 B2 10/2009 Chang
7,619,594 B2 11/2009 Hu
7,619,597 B2 11/2009 Nathan et al.
7,633,470 B2 12/2009 Kane
7,656,370 B2 2/2010 Schneider et al.
7,800,558 B2 9/2010 Routley et al.
7,847,764 B2 12/2010 Cok et al.
7,859,492 B2 12/2010 Kohno
7,868,859 B2 1/2011 Tomida et al.
7,876,294 B2 1/2011 Sasaki et al.
7,924,249 B2 4/2011 Nathan et al.
7,932,883 B2 4/2011 Klompenhouwer et al.
7,969,390 B2 6/2011 Yoshida
7,978,187 B2 7/2011 Nathan et al.
7,994,712 B2 8/2011 Sung et al.
8,026,876 B2 9/2011 Nathan et al.
8,049,420 B2 11/2011 Tamura et al.
8,077,123 B2 12/2011 Naugler, Jr.
8,115,707 B2 2/2012 Nathan et al.
8,223,177 B2 7/2012 Nathan et al.
8,232,939 B2 7/2012 Nathan et al.
8,259,044 B2 9/2012 Nathan et al.
8,264,431 B2 9/2012 Bulovic et al.
8,279,143 B2 10/2012 Nathan et al.
8,299,984 B2 * 10/2012 Nathan ................ G09G 3/3233 315/169.3
8,339,386 B2 12/2012 Leon et al.
8,589,100 B2 * 11/2013 Chaji ....................... G09G 3/32 345/204
2001/0002703 A1 6/2001 Koyama
2001/0009283 A1 7/2001 Arao et al.
2001/0024181 A1 9/2001 Kubota
2001/0024186 A1 9/2001 Kane et al.
2001/0026257 A1 10/2001 Kimura
2001/0030323 A1 10/2001 Ikeda
2001/0040541 A1 11/2001 Yoneda et al.
2001/0043173 A1 11/2001 Troutman
2001/0045929 A1 11/2001 Prache
2001/0052606 A1 12/2001 Sempel et al.
2001/0052940 A1 12/2001 Hagihara et al.
2002/0000576 A1 1/2002 Inukai
2002/0011796 A1 1/2002 Koyama
2002/0011799 A1 1/2002 Kimura
2002/0012057 A1 1/2002 Kimura
2002/0014851 A1 2/2002 Tai et al.
2002/0018034 A1 2/2002 Ohki et al.
2002/0030190 A1 3/2002 Ohtani et al.
2002/0047565 A1 4/2002 Nara et al.
2002/0052086 A1 5/2002 Maeda
2002/0067134 A1 6/2002 Kawashima
2002/0084463 A1 7/2002 Sanford et al.
2002/0101172 A1 8/2002 Bu
2002/0105279 A1 8/2002 Kimura
2002/0117722 A1 8/2002 Osada et al.
2002/0122308 A1 9/2002 Ikeda
2002/0158587 A1 10/2002 Komiya
2002/0158666 A1 10/2002 Azami et al.
2002/0158823 A1 10/2002 Zavracky et al.
2002/0167474 A1 11/2002 Everitt
2002/0180369 A1 12/2002 Koyama
2002/0180721 A1 12/2002 Kimura et al.
2002/0186214 A1 12/2002 Siwinski
2002/0190924 A1 12/2002 Asano et al.
2002/0190971 A1 12/2002 Nakamura et al.
2002/0195967 A1 12/2002 Kim et al.
2002/0195968 A1 12/2002 Sanford et al.
2003/0020413 A1 1/2003 Oomura
2003/0030603 A1 2/2003 Shimoda
2003/0043088 A1 3/2003 Boothet al.
2003/0057895 A1 3/2003 Kimura
2003/0058226 A1 3/2003 Bertram et al.
2003/0062524 A1 4/2003 Kimura
2003/0063081 A1 4/2003 Kimura et al.
2003/0071821 A1 4/2003 Sundahl et al.
2003/0076048 A1 4/2003 Rutherford
2003/0090447 A1 5/2003 Kimura
2003/0090481 A1 5/2003 Kimura
2003/0107560 A1 6/2003 Yumoto et al.
2003/0111966 A1 6/2003 Mikami et al.
2003/0122745 A1 7/2003 Miyazawa
2003/0122813 A1 7/2003 Ishizuki et al.
2003/0142088 A1 7/2003 LeChevalier
2003/0151569 A1 8/2003 Lee et al.
2003/0156101 A1 8/2003 Le Chevalier
2003/0174152 A1 9/2003 Noguchi
2003/0179626 A1 9/2003 Sanford et al.
2003/0197663 A1 10/2003 Lee et al.
2003/0210256 A1 11/2003 Mori et al.
2003/0230141 A1 12/2003 Gilmour et al.
2003/0230980 A1 12/2003 Forrest et al.
2003/0231148 A1 12/2003 Lin et al.
2004/0032382 A1 2/2004 Cok et al.
2004/0066357 A1 4/2004 Kawasaki
2004/0070557 A1 4/2004 Asano et al.
2004/0070565 A1 4/2004 Nayar et al.
2004/0090186 A1 5/2004 Kanauchi et al.
2004/0090400 A1 5/2004 Yoo
2004/0095297 A1 5/2004 Libsch et al.
2004/0100427 A1 5/2004 Miyazawa
2004/0108518 A1 6/2004 Jo
2004/0135749 A1 7/2004 Kondakov et al.
2004/0145547 A1 7/2004 Oh
2004/0150592 A1 8/2004 Mizukoshi et al.
2004/0150594 A1 8/2004 Koyama et al.
2004/0150595 A1 8/2004 Kasai
2004/0155841 A1 8/2004 Kasai
2004/0174347 A1 9/2004 Sun et al.
2004/0174354 A1 9/2004 Ono et al.
2004/0178743 A1 9/2004 Miller et al.
2004/0183759 A1 9/2004 Stevenson et al.
2004/0196275 A1 10/2004 Hattori
2004/0207615 A1 10/2004 Yumoto
2004/0239596 A1 12/2004 Ono et al.
2004/0252089 A1 12/2004 Ono et al.
2004/0257313 A1 12/2004 Kawashima et al.
2004/0257353 A1 12/2004 Imamura et al.
2004/0257355 A1 12/2004 Naugler
2004/0263437 A1 12/2004 Hattori
2004/0263444 A1 12/2004 Kimura
2004/0263445 A1 12/2004 Inukai et al.
2004/0263541 A1 12/2004 Takeuchi et al.
2005/0007355 A1 1/2005 Miura
2005/0007357 A1 1/2005 Yamashita et al.
2005/0017650 A1 1/2005 Fryer et al.
2005/0024081 A1 2/2005 Kuo et al.

(56) References Cited

U.S. PATENT DOCUMENTS

| | | | |
|---|---|---|---|
| 2005/0024393 | A1 | 2/2005 | Kondo et al. |
| 2005/0030267 | A1 | 2/2005 | Tanghe et al. |
| 2005/0057580 | A1 | 3/2005 | Yamano et al. |
| 2005/0067970 | A1 | 3/2005 | Libsch et al. |
| 2005/0067971 | A1 | 3/2005 | Kane |
| 2005/0068270 | A1 | 3/2005 | Awakura |
| 2005/0068275 | A1 | 3/2005 | Kane |
| 2005/0073264 | A1 | 4/2005 | Matsumoto |
| 2005/0083323 | A1 | 4/2005 | Suzuki et al. |
| 2005/0088103 | A1 | 4/2005 | Kageyama et al. |
| 2005/0110420 | A1 | 5/2005 | Arnold et al. |
| 2005/0110807 | A1 | 5/2005 | Chang |
| 2005/0140598 | A1 | 6/2005 | Kim et al. |
| 2005/0140610 | A1 | 6/2005 | Smith et al. |
| 2005/0145891 | A1 | 7/2005 | Abe |
| 2005/0156831 | A1 | 7/2005 | Yamazaki et al. |
| 2005/0168416 | A1 | 8/2005 | Hashimoto et al. |
| 2005/0179626 | A1 | 8/2005 | Yuki et al. |
| 2005/0179628 | A1 | 8/2005 | Kimura |
| 2005/0185200 | A1 | 8/2005 | Tobol |
| 2005/0200575 | A1 | 9/2005 | Kim et al. |
| 2005/0206590 | A1 | 9/2005 | Sasaki et al. |
| 2005/0219184 | A1 | 10/2005 | Zehner et al. |
| 2005/0248515 | A1 | 11/2005 | Naugler et al. |
| 2005/0269959 | A1 | 12/2005 | Uchino et al. |
| 2005/0269960 | A1 | 12/2005 | Ono et al. |
| 2005/0280615 | A1 | 12/2005 | Cok et al. |
| 2005/0280766 | A1 | 12/2005 | Johnson et al. |
| 2005/0285822 | A1 | 12/2005 | Reddy et al. |
| 2005/0285825 | A1 | 12/2005 | Eom et al. |
| 2006/0001613 | A1 | 1/2006 | Routley et al. |
| 2006/0007072 | A1 | 1/2006 | Choi et al. |
| 2006/0012310 | A1 | 1/2006 | Chen et al. |
| 2006/0012311 | A1 | 1/2006 | Ogawa |
| 2006/0027807 | A1 | 2/2006 | Nathan et al. |
| 2006/0030084 | A1 | 2/2006 | Young |
| 2006/0038762 | A1 | 2/2006 | Chou |
| 2006/0066533 | A1 | 3/2006 | Sato et al. |
| 2006/0077135 | A1 | 4/2006 | Cok et al. |
| 2006/0082523 | A1 | 4/2006 | Guo et al. |
| 2006/0092185 | A1 | 5/2006 | Jo et al. |
| 2006/0097628 | A1 | 5/2006 | Suh et al. |
| 2006/0097631 | A1 | 5/2006 | Lee |
| 2006/0103611 | A1 | 5/2006 | Choi |
| 2006/0149493 | A1 | 7/2006 | Sambandan et al. |
| 2006/0170623 | A1 | 8/2006 | Naugler, Jr. et al. |
| 2006/0176250 | A1 | 8/2006 | Nathan et al. |
| 2006/0208961 | A1 | 9/2006 | Nathan et al. |
| 2006/0232522 | A1 | 10/2006 | Roy et al. |
| 2006/0244697 | A1 | 11/2006 | Lee et al. |
| 2006/0261841 | A1 | 11/2006 | Fish |
| 2006/0273997 | A1 | 12/2006 | Nathan et al. |
| 2006/0284801 | A1 | 12/2006 | Yoon et al. |
| 2006/0284895 | A1 | 12/2006 | Marcu et al. |
| 2006/0290618 | A1 | 12/2006 | Goto |
| 2007/0001937 | A1 | 1/2007 | Park et al. |
| 2007/0001939 | A1 | 1/2007 | Hashimoto et al. |
| 2007/0008268 | A1 | 1/2007 | Park et al. |
| 2007/0008297 | A1 | 1/2007 | Bassetti |
| 2007/0057873 | A1 | 3/2007 | Uchino et al. |
| 2007/0069998 | A1 | 3/2007 | Naugler et al. |
| 2007/0075727 | A1 | 4/2007 | Nakano et al. |
| 2007/0076226 | A1 | 4/2007 | Klompenhouwer et al. |
| 2007/0080905 | A1 | 4/2007 | Takahara |
| 2007/0080906 | A1 | 4/2007 | Tanabe |
| 2007/0080908 | A1 | 4/2007 | Nathan et al. |
| 2007/0097038 | A1 | 5/2007 | Yamazaki et al. |
| 2007/0097041 | A1 | 5/2007 | Park et al. |
| 2007/0103419 | A1 | 5/2007 | Uchino et al. |
| 2007/0115221 | A1 | 5/2007 | Buchhauser et al. |
| 2007/0182671 | A1 | 8/2007 | Nathan et al. |
| 2007/0236517 | A1 | 10/2007 | Kimpe |
| 2007/0241999 | A1 | 10/2007 | Lin |
| 2007/0273294 | A1 | 11/2007 | Nagayama |
| 2007/0285359 | A1 | 12/2007 | Ono |
| 2007/0290958 | A1 | 12/2007 | Cok |
| 2007/0296672 | A1 | 12/2007 | Kim et al. |
| 2008/0001525 | A1 | 1/2008 | Chao et al. |
| 2008/0001544 | A1 | 1/2008 | Murakami et al. |
| 2008/0036708 | A1 | 2/2008 | Shirasaki |
| 2008/0042942 | A1 | 2/2008 | Takahashi |
| 2008/0042948 | A1 | 2/2008 | Yamashita et al. |
| 2008/0048951 | A1 | 2/2008 | Naugler, Jr. et al. |
| 2008/0055209 | A1 | 3/2008 | Cok |
| 2008/0074413 | A1 | 3/2008 | Ogura |
| 2008/0088549 | A1 | 4/2008 | Nathan et al. |
| 2008/0088648 | A1 | 4/2008 | Nathan et al. |
| 2008/0117144 | A1 | 5/2008 | Nakano et al. |
| 2008/0150847 | A1 | 6/2008 | Kim et al. |
| 2008/0231558 | A1 | 9/2008 | Naugler |
| 2008/0231562 | A1 | 9/2008 | Kwon |
| 2008/0252571 | A1 | 10/2008 | Hente et al. |
| 2008/0290805 | A1 | 11/2008 | Yamada et al. |
| 2008/0297055 | A1 | 12/2008 | Miyake et al. |
| 2009/0058772 | A1 | 3/2009 | Lee |
| 2009/0160743 | A1 | 6/2009 | Tomida et al. |
| 2009/0174628 | A1 | 7/2009 | Wang et al. |
| 2009/0184901 | A1 | 7/2009 | Kwon |
| 2009/0195483 | A1 | 8/2009 | Naugler, Jr. et al. |
| 2009/0201281 | A1 | 8/2009 | Routley et al. |
| 2009/0213046 | A1 | 8/2009 | Nam |
| 2010/0004891 | A1 | 1/2010 | Ahlers et al. |
| 2010/0026725 | A1 | 2/2010 | Smith |
| 2010/0060911 | A1 | 3/2010 | Marcu et al. |
| 2010/0165002 | A1 | 7/2010 | Ahn |
| 2010/0194670 | A1 | 8/2010 | Cok |
| 2010/0207960 | A1 | 8/2010 | Kimpe et al. |
| 2010/0277400 | A1 | 11/2010 | Jeong |
| 2010/0315319 | A1 | 12/2010 | Cok et al. |
| 2011/0069051 | A1 | 3/2011 | Nakamura et al. |
| 2011/0069089 | A1 | 3/2011 | Kopf et al. |
| 2011/0074750 | A1 | 3/2011 | Leon et al. |
| 2011/0149166 | A1 | 6/2011 | Botzas et al. |
| 2011/0227964 | A1 | 9/2011 | Chaji et al. |
| 2011/0293480 | A1 | 12/2011 | Mueller |
| 2012/0056558 | A1 | 3/2012 | Toshiya et al. |
| 2012/0062565 | A1 | 3/2012 | Fuchs et al. |
| 2012/0299978 | A1 | 11/2012 | Chaji |
| 2013/0027381 | A1 | 1/2013 | Nathan et al. |
| 2013/0057595 | A1 | 3/2013 | Nathan et al. |

FOREIGN PATENT DOCUMENTS

| | | | |
|---|---|---|---|
| CA | 2 249 592 | | 7/1998 |
| CA | 2 368 386 | | 9/1999 |
| CA | 2 242 720 | | 1/2000 |
| CA | 2 354 018 | | 6/2000 |
| CA | 2 432 530 | | 7/2002 |
| CA | 2 436 451 | | 8/2002 |
| CA | 2 438 577 | | 8/2002 |
| CA | 2 463 653 | | 1/2004 |
| CA | 2 498 136 | | 3/2004 |
| CA | 2 522 396 | | 11/2004 |
| CA | 2 443 206 | | 3/2005 |
| CA | 2 472 671 | | 12/2005 |
| CA | 2 567 076 | | 1/2006 |
| CA | 2 526 782 | | 4/2006 |
| CA | 2 550 102 | | 4/2008 |
| CN | 1381032 | | 11/2002 |
| CN | 1448908 | | 10/2003 |
| CN | 1760945 | | 4/2006 |
| EP | 0 158 366 | | 10/1985 |
| EP | 1 028 471 | | 8/2000 |
| EP | 1 111 577 | | 6/2001 |
| EP | 1 130 565 | A1 | 9/2001 |
| EP | 1 194 013 | | 4/2002 |
| EP | 1 335 430 | A1 | 8/2003 |
| EP | 1 372 136 | | 12/2003 |
| EP | 1 381 019 | | 1/2004 |
| EP | 1 418 566 | | 5/2004 |
| EP | 1 429 312 | A | 6/2004 |
| EP | 1 465 143 | A | 10/2004 |
| EP | 1 469 448 | A | 10/2004 |
| EP | 1 521 203 | A2 | 4/2005 |

(56) References Cited

FOREIGN PATENT DOCUMENTS

| | | |
|---|---|---|
| EP | 1 594 347 | 11/2005 |
| EP | 1 784 055 A2 | 5/2007 |
| EP | 1 879 169 A1 | 1/2008 |
| EP | 1 879 172 | 1/2008 |
| GB | 2 389 951 | 12/2003 |
| JP | 1272298 | 10/1989 |
| JP | 4-042619 | 2/1992 |
| JP | 6-314977 | 11/1994 |
| JP | 8-340243 | 12/1996 |
| JP | 09-090405 | 4/1997 |
| JP | 10-254410 | 9/1998 |
| JP | 11-202295 | 7/1999 |
| JP | 11-219146 | 8/1999 |
| JP | 11 231805 | 8/1999 |
| JP | 11-282419 | 10/1999 |
| JP | 2000-056847 | 2/2000 |
| JP | 2000-81607 | 3/2000 |
| JP | 2001-134217 | 5/2001 |
| JP | 2001-195014 | 7/2001 |
| JP | 2002-055654 | 2/2002 |
| JP | 2002-91376 | 3/2002 |
| JP | 2002-514320 | 5/2002 |
| JP | 2002-278513 | 9/2002 |
| JP | 2002-333862 | 11/2002 |
| JP | 2003-076331 | 3/2003 |
| JP | 2003-124519 | 4/2003 |
| JP | 2003-177709 | 6/2003 |
| JP | 2003-271095 | 9/2003 |
| JP | 2003-308046 | 10/2003 |
| JP | 2003-317944 | 11/2003 |
| JP | 2004-145197 | 5/2004 |
| JP | 2004-287345 | 10/2004 |
| JP | 2005-057217 | 3/2005 |
| JP | 2007-163712 A | 6/2007 |
| JP | 4-158570 | 10/2008 |
| JP | 2009-265621 A | 11/2009 |
| JP | 2013-506168 A | 2/2013 |
| KR | 2004-0100887 | 12/2004 |
| TW | 342486 | 10/1998 |
| TW | 473622 | 1/2002 |
| TW | 485337 | 5/2002 |
| TW | 502233 | 9/2002 |
| TW | 538650 | 6/2003 |
| TW | 1221268 | 9/2004 |
| TW | 1223092 | 11/2004 |
| TW | 200727247 | 7/2007 |
| WO | WO 98/48403 | 10/1998 |
| WO | WO 99/48079 | 9/1999 |
| WO | WO 01/06484 | 1/2001 |
| WO | WO 01/27910 A1 | 4/2001 |
| WO | WO 01/63587 A2 | 8/2001 |
| WO | WO 02/067327 A | 8/2002 |
| WO | WO 03/001496 A1 | 1/2003 |
| WO | WO 03/034389 A | 4/2003 |
| WO | WO 03/058594 A1 | 7/2003 |
| WO | WO 03-063124 | 7/2003 |
| WO | WO 03/077231 | 9/2003 |
| WO | WO 2004/003877 | 1/2004 |
| WO | WO 2004/025615 A | 3/2004 |
| WO | WO 2004/034364 | 4/2004 |
| WO | WO 2004/047058 | 6/2004 |
| WO | WO 2004/104975 A1 | 12/2004 |
| WO | WO 2005/022498 | 3/2005 |
| WO | WO 2005/022500 A | 3/2005 |
| WO | WO 2005/029455 | 3/2005 |
| WO | WO 2005/029456 | 3/2005 |
| WO | WO 2005/055185 | 6/2005 |
| WO | WO 2006/000101 A1 | 1/2006 |
| WO | WO 2006/053424 | 5/2006 |
| WO | WO 2006/063448 A | 6/2006 |
| WO | WO 2006/084360 | 8/2006 |
| WO | WO 2007/003877 A | 1/2007 |
| WO | WO 2007/079572 | 7/2007 |
| WO | WO 2007/120849 A2 | 10/2007 |
| WO | WO 2009/055920 | 5/2009 |
| WO | WO 2010/023270 | 3/2010 |
| WO | WO 2011/041224 | 4/2011 |

OTHER PUBLICATIONS

Ahnood et al.: "Effect of threshold voltage instability on field effect mobility in thin film transistors deduced from constant current measurements"; dated Aug. 2009.

Alexander et al.: "Pixel circuits and drive schemes for glass and elastic AMOLED displays"; dated Jul. 2005 (9 pages).

Alexander et al.: "Unique Electrical Measurement Technology for Compensation, Inspection, and Process Diagnostics of AMOLED HDTV"; dated May 2010 (4 pages).

Ashtiani et al.: "AMOLED Pixel Circuit With Electronic Compensation of Luminance Degradation"; dated Mar. 2007 (4 pages).

Chaji et al.: "A Current-Mode Comparator for Digital Calibration of Amorphous Silicon AMOLED Displays"; dated Jul. 2008 (5 pages).

Chaji et al.: "A fast settling current driver based on the CCII for AMOLED displays"; dated Dec. 2009 (6 pages).

Chaji et al.: "A Low-Cost Stable Amorphous Silicon AMOLED Display with Full V~T- and V~O~L~E~D Shift Compensation"; dated May 2007 (4 pages).

Chaji et al.: "A low-power driving scheme for a-Si:H active-matrix organic light-emitting diode displays"; dated Jun. 2005 (4 pages).

Chaji et al.: "A low-power high-performance digital circuit for deep submicron technologies"; dated Jun. 2005 (4 pages).

Chaji et al.: "A novel a-Si:H AMOLED pixel circuit based on short-term stress stability of a-Si:H TFTs"; dated Oct. 2005 (3 pages).

Chaji et al.: "A Novel Driving Scheme and Pixel Circuit for AMOLED Displays"; dated Jun. 2006 (4 pages).

Chaji et al.: "A Novel Driving Scheme for High Resolution Large-area a-Si:H AMOLED displays"; dated Aug. 2005 (3 pages).

Chaji et al.: "A Stable Voltage-Programmed Pixel Circuit for a-Si:H AMOLED Displays"; dated Dec. 2006 (12 pages).

Chaji et al.: "A Sub-μA fast-settling current-programmed pixel circuit for AMOLED displays"; dated Sep. 2007.

Chaji et al.: "An Enhanced and Simplified Optical Feedback Pixel Circuit for AMOLED Displays"; dated Oct. 2006.

Chaji et al.: "Compensation technique for DC and transient instability of thin film transistor circuits for large-area devices"; dated Aug. 2008.

Chaji et al.: "Driving scheme for stable operation of 2-TFT a-Si AMOLED pixel"; dated Apr. 2005 (2 pages).

Chaji et al.: "Dynamic-effect compensating technique for stable a-Si:H AMOLED displays"; dated Aug. 2005 (4 pages).

Chaji et al.: "Electrical Compensation of OLED Luminance Degradation"; dated Dec. 2007 (3 pages).

Chaji et al.: "eUTDSP: a design study of a new VLIW-based DSP architecture"; dated My 2003 (4 pages).

Chaji et al.: "Fast and Offset-Leakage Insensitive Current-Mode Line Driver for Active Matrix Displays and Sensors"; dated Feb. 2009 (8 pages).

Chaji et al.: "High Speed Low Power Adder Design With a New Logic Style: Pseudo Dynamic Logic (SDL)"; dated Oct. 2001 (4 pages).

Chaji et al.: "High-precision, fast current source for large-area current-programmed a-Si flat panels"; dated Sep. 2006 (4 pages).

Chaji et al.: "Low-Cost AMOLED Television with IGNIS Compensating Technology"; dated May 2008 (4 pages).

Chaji et al.: "Low-Cost Stable a-Si:H AMOLED Display for Portable Applications"; dated Jun. 2006 (4 pages).

Chaji et al.: "Low-Power Low-Cost Voltage-Programmed a-Si:H AMOLED Display"; dated Jun. 2008 (5 pages).

Chaji et al.: "Merged phototransistor pixel with enhanced near infrared response and flicker noise reduction for biomolecular imaging"; dated Nov. 2008 (3 pages).

Chaji et al.: "Parallel Addressing Scheme for Voltage-Programmed Active-Matrix OLED Displays"; dated May 2007 (6 pages).

Chaji et al.: "Pseudo dynamic logic (SDL): a high-speed and low-power dynamic logic family"; dated 2002 (4 pages).

(56) References Cited

OTHER PUBLICATIONS

Chaji et al.: "Stable a-Si:H circuits based on short-term stress stability of amorphous silicon thin film transistors"; dated May 2006 (4 pages).
Chaji et al.: "Stable Pixel Circuit for Small-Area High- Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report for EP Application No. EP 10166143, dated Sep. 3, 2010 (2 pages).
European Search Report for European Application No. EP 11739485.8-1904 dated Aug. 6, 2013, (14 pages).
European Search Report for European Application No. EP 011122313 dated Sep. 14, 2005 (4 pages).
European Search Report for European Application No. EP 04786661 dated Mar. 9, 2009.
European Search Report for European Application No. EP 05759141 dated Oct. 30, 2009 (2 pages).
European Search Report for European Application No. EP 05819617 dated Jan. 30, 2009.
European Search Report for European Application No. EP 06 70 5133 dated Jul. 18, 2008.
European Search Report for European Application No. EP 06721798 dated Nov. 12, 2009 (2 pages).
European Search Report for European Application No. EP 07719579 dated May 20, 2009.
European Search Report for European Application No. EP 07815784 dated Jul. 20, 2010 (2 pages).
European Search Report for European Application No. EP 07710608.6 dated Mar. 19, 2010 (7 pages).
European Search Report, Application No. EP 10834294.0-1903, dated Apr. 8, 2013, (9 pages).
European Supplementary Search Report corresponding to European Application No. EP 04786662 dated Jan. 19, 2007 (2 pages).
Extended European Search Report mailed Apr. 27, 2011 issued during prosecution of European patent application No. EP 09733076.5 (13 pages).
Extended European Search Report mailed Jul. 11, 2012 which issued in corresponding European Patent Application No. EP 11191641.7 (14 pages).
Extended European Search Report mailed Nov. 29, 2012, issued in European Patent Application No. EP 11168677.0 (13 page).
Fossum, Eric R.. "Active Pixel Sensors: Are CCD's Dinosaurs?" SPIE: Symposium on Electronic Imaging. Feb. 1, 1993 (13 pages).
International Preliminary Report on Patentability for International Application No. PCT/CA2005/001007 dated Oct. 16, 2006, 4 pages.
International Search Report corresponding to International Application No. PCT/IB2011/050502, dated Jun. 27, 2011 (6 pages).
International Search Report corresponding to International Application No. PCT/CA2004/001742, Canadian Patent Office, dated Feb. 21, 2005 (2 pages).
International Search Report corresponding to International Application No. PCT/IB2010/055541 filed Dec. 1, 2010, dated May 26, 2011; 5 pages.
International Search Report corresponding to International Application No. PCT/IB2011/055135, Canadian Patent Office, dated Apr. 16, 2012 (5 pages).
International Search Report for Application No. PCT/IB2010/055486, Dated Apr. 19, 2011, 5 pages.
International Search Report for International Application No. PCT/CA2005/001007 dated Oct. 18, 2005.
International Search Report for International Application No. PCT/CA2007/000652 dated Jul. 25, 2007.
European Search Report for European Application No. PCT/CA2006/000177 dated Jun. 2, 2006.
International Search Report for International Application No. PCT/CA2004/001741 dated Feb. 21, 2005.
International Search Report for PCT Application No. PCT/CA2009/001769, dated Apr. 8, 2010 (3 pages).
International Search Report mailed Dec. 3, 2002, issued in International Patent Application No. PCT/JP02/09668 (4 pages).
International Search Report mailed Jul. 30, 2009 for International Application No. PCT/CA2009/000501 (4 pages).
International Search Report mailed Mar. 21, 2006 issued in International Patent Application No. PCT/CA2005/001897 (2 pages).
International Search Report, PCT/IB2012/052372, mailed Sep. 12, 2012 (3 pages).
International Searching Authority Search Report, PCT/IB2010/055481, dated Apr. 7, 2011, 3 pages.
International Searching Authority Search Report, PCT/IB2011/051103, dated Jul. 8, 2011, 3 pages.
International Searching Authority Written Opinion, PCT/IB2010/055481, dated Apr. 7, 2011, 6 pages.
International Searching Authority Written Opinion, PCT/IB2011/051103, dated Jul. 8, 2011, 6 pages.
International Written Opinion corresponding to International Application No. PCT/CA2004/001742, Canadian Patent Office, dated Feb. 21, 2005 (5 pages).
International Written Opinion corresponding to International Application No. PCT/IB2011/055135, Canadian Patent Office, dated Apr. 16, 2012 (5 pages).
International Written Opinion for Application No. PCT/IB2010/055486, Dated Apr. 19, 2011, 8 pages.
International Written Opinion for International Application No. PCT/CA2009/000501 mailed Jul. 30, 2009 (6 pages).
International Written Opinion mailed Mar. 21, 2006 corresponding to International Patent Application No. PCT/CA2005/001897 (4 pages).
International Written Opinion of the International Searching Authority corresponding to International Application No. PCT/IB2011/050502, dated Jun. 27, 2011 (7 pages).
International Written Opinion of the International Searching Authority corresponding to International Application No. PCT/IB2010/055541, dated May 26, 2011; 6 pages.
International Written Opinion, PCT/IB2012/052372, mailed Sep. 12, 2012 (6 pages).
Jafarabadiashtiani et al.: "A New Driving Method for a-Si AMOLED Displays Based on Voltage Feedback"; dated 2005 (4 pages).
Kanicki, J., et al. "Amorphous Silicon Thin-Film Transistors Based Active-Matrix Organic Light-Emitting Displays." Asia Display: International Display Workshops, Sep. 2001 (pp. 315-318).
Karim, K. S., et al. "Amorphous Silicon Active Pixel Sensor Readout Circuit for Digital Imaging." IEEE: Transactions on Electron Devices. vol. 50, No. 1, Jan. 2003 (pp. 200-208).
Lee et al.: "Ambipolar Thin-Film Transistors Fabricated by PECVD Nanocrystalline Silicon"; dated 2006.
Lee, Wonbok: "Thermal Management in Microprocessor Chips and Dynamic Backlight Control in Liquid Crystal Displays", Ph.D. Dissertation, University of Southern California (124 pages).
Ma E Y et al.: "organic light emitting diode/thin film transistor integration for foldable displays" dated Sep. 15, 1997(4 pages).
Matsueda y et al.: "35.1: 2.5-in. AMOLED with Integrated 6-bit Gamma Compensated Digital Data Driver"; dated May 2004.
Mendes E., et al. "A High Resolution Switch-Current Memory Base Cell." IEEE: Circuits and Systems. vol. 2, Aug. 1999 (pp. 718-721).
Nathan A. et al., "Thin Film imaging technology on glass and plastic" ICM 2000, proceedings of the 12 international conference on microelectronics, dated Oct. 31, 2001 (4 pages).
Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Nathan et al.: "Backplane Requirements for active Matrix Organic Light Emitting Diode Displays,"; dated 2006 (16 pages).
Nathan et al.: "Call for papers second international workshop on compact thin-film transistor (TFT) modeling for circuit simulation"; dated Sep. 2009 (1 page).

(56) References Cited

OTHER PUBLICATIONS

Nathan et al.: "Driving schemes for a-Si and LTPS AMOLED displays"; dated Dec. 2005 (11 pages).
Nathan et al.: "Invited Paper: a-Si for AMOLED—Meeting the Performance and Cost Demands of Display Applications (Cell Phone to HDTV)", dated 2006 (4 pages).
Office Action in Japanese patent application No. JP2006-527247 dated Mar. 15, 2010. (8 pages).
Office Action in Japanese patent application No. JP2007-545796 dated Sep. 5, 2011. (8 pages).
Partial European Search Report mailed Mar. 20, 2012 which issued in corresponding European Patent Application No. EP 11191641.7 (8 pages).
Partial European Search Report mailed Sep. 22, 2011 corresponding to European Patent Application No. EP 11168677.0 (5 pages).
Philipp: "Charge transfer sensing" SENSOR REVIEW, vol. 19, No. 2, Dec. 31, 1999, 10 pages.
Rafati et al.: "Comparison of a 17 b multiplier in Dual-rail domino and in Dual-rail D L (D L) logic styles"; dated 2002 (4 pages).
Safavian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Search Report for Taiwan Invention Patent Application No. 093128894 dated May 1, 2012. (1 page).
Search Report for Taiwan Invention Patent Application No. 94144535 dated Nov. 1, 2012. (1 page).
Spindler et al., System Considerations for RGBW OLED Displays, Journal of the SID 14/1, 2006, pp. 37-48.
Stewart M. et al., "Polysilicon TFT technology for active matrix oled displays" IEEE transactions on electron devices, vol. 48, No. 5, dated May 2001 (7 pages).
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Yu, Jennifer: "Improve OLED Technology for Display", Ph.D. Dissertation, Massachusetts Institute of Technology, Sep. 2008 (151 pages).
Extended European Search Report mailed Aug. 6, 2013, issued in European Patent Application No. 11739485.8 (14 pages).
International Search Report corresponding to co-pending International Patent Application Serial No. PCT/IB2013/054251, Canadian Intellectual Property Office, dated Sep. 11, 2013; (4 pages).
International Written Opinion corresponding to co-pending International Patent Application Serial No. PCT/IB2013/054251, Canadian Intellectual Property Office, dated Sep. 11, 2013; (5 pages).

* cited by examiner

SYSTEM AND METHODS FOR EXTRACTING CORRELATION CURVES FOR AN ORGANIC LIGHT EMITTING DEVICE

CROSS-REFERENCE TO RELATED APPLICATIONS

This application is a continuation of, and claims priority to, U.S. patent application Ser. No. 13/020,252, filed Feb. 3, 2011, now allowed, which is hereby incorporated by reference herein in its entirety, and which in turn claims priority to.

FIELD OF THE INVENTION

This invention is directed generally to displays that use light emissive devices such as OLEDs and, more particularly, to extracting characterization correlation curves under different stress conditions in such displays to compensate for aging of the light emissive devices.

BACKGROUND OF THE INVENTION

Currently, active matrix organic light emitting device ("AMOLED") displays are being introduced for numerous applications. The advantages of such displays include lower power consumption, manufacturing flexibility, and faster refresh rate over conventional liquid crystal displays. In contrast to conventional liquid crystal displays, there is no backlighting in an AMOLED display as each pixel consists of different colored OLEDs emitting light independently. The OLEDs emit light based on current supplied through a drive transistor. The drive transistor is typically a thin film transistor (TFT). The power consumed in each pixel has a direct relation with the magnitude of the generated light in that pixel.

The drive-in current of the drive transistor determines the pixel's OLED luminance. Since the pixel circuits are voltage programmable, the spatial-temporal thermal profile of the display surface changing the voltage-current characteristic of the drive transistor impacts the quality of the display. Proper corrections may be applied to the video stream in order to compensate for the unwanted thermal-driven visual effects.

During operation of an organic light emitting diode device, it undergoes degradation, which causes light output at a constant current to decrease over time. The OLED device also undergoes an electrical degradation, which causes the current to drop at a constant bias voltage over time. These degradations are caused primarily by stress related to the magnitude and duration of the applied voltage on the OLED and the resulting current passing through the device. Such degradations are compounded by contributions from the environmental factors such as temperature, humidity, or presence of oxidants over time. The aging rate of the thin film transistor devices is also environmental and stress (bias) dependent. The aging of the drive transistor and the OLED may be properly determined via calibrating the pixel against stored historical data from the pixel at previous times to determine the aging effects on the pixel. Accurate aging data is therefore necessary throughout the lifetime of the display device.

In one compensation technique for OLED displays, the aging (and/or uniformity) of a panel of pixels is extracted and stored in lookup tables as raw or processed data. Then a compensation module uses the stored data to compensate for any shift in electrical and optical parameters of the OLED (e.g., the shift in the OLED operating voltage and the optical efficiency) and the backplane (e.g., the threshold voltage shift of the TFT), hence the programming voltage of each pixel is modified according to the stored data and the video content. The compensation module modifies the bias of the driving TFT in a way that the OLED passes enough current to maintain the same luminance level for each gray-scale level. In other words, a correct programming voltage properly offsets the electrical and optical aging of the OLED as well as the electrical degradation of the TFT.

The electrical parameters of the backplane TFTs and OLED devices are continuously monitored and extracted throughout the lifetime of the display by electrical feedback-based measurement circuits. Further, the optical aging parameters of the OLED devices are estimated from the OLED' s electrical degradation data. However, the optical aging effect of the OLED is dependent on the stress conditions placed on individual pixels as well, and since the stresses vary from pixel to pixel, accurate compensation is not assured unless the compensation tailored for a specific stress level is determined.

There is therefore a need for efficient extraction of characterization correlation curves of the optical and electrical parameters that are accurate for stress conditions on active pixels for compensation for aging and other effects. There is also a need for having a variety of characterization correlation curves for a variety of stress conditions that the active pixels may be subjected to during operation of the display. There is a further need for accurate compensation systems for pixels in an organic light emitting device based display.

SUMMARY

In accordance with one example, a method for determining a characterization correlation curve for aging compensation for an organic light emitting device (OLED) based pixel in a display is disclosed. A first stress condition is applied to a reference device. A baseline optical characteristic and a baseline electrical characteristic of the reference device are stored. An output voltage based on a reference current to determine an electrical characteristic of the reference device is periodically measured. The luminance of the reference device is periodically measured to determine an optical characteristic of the reference device. A characterization correlation curve corresponding to the first stress condition based on the baseline optical and electrical characteristics and the determined electrical and optical characteristics of the reference device is determined. The characterization correlation curve corresponding to the first stress condition is stored.

Another example is a display system for compensating of aging effects. The display system includes a plurality of active pixels displaying an image, the active pixels each including a drive transistor and an organic light emitting diode (OLED). A memory stores a first characterization correlation curve for a first predetermined stress condition and a second characterization correlation curve for a second predetermined stress condition. A controller is coupled to the plurality of active pixels. The controller determines a stress condition on one of the active pixels, the stress condition falling between the first and second predetermined stress conditions. The controller determines a compensation factor to apply to a programming voltage based on the characterization correlation curves of the first and second stress conditions.

Another example is a method of determining a characterization correlation curve for an OLED device in a display. A first characterization correlation curve based on a first group of reference pixels at a predetermined high stress condition is stored. A second characterization correlation curve based on a second group of reference pixels at a predetermined low stress condition is stored. A stress level of an active pixel falling between the high and low stress conditions is determined. A compensation factor based on the stress on the active pixel is determined. The compensation factor is based on the stress on the active pixel and the first and second characterization correlation curve. A programming voltage to the active pixel is adjusted based on the characterization correlation curve.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings.

Figure 1:
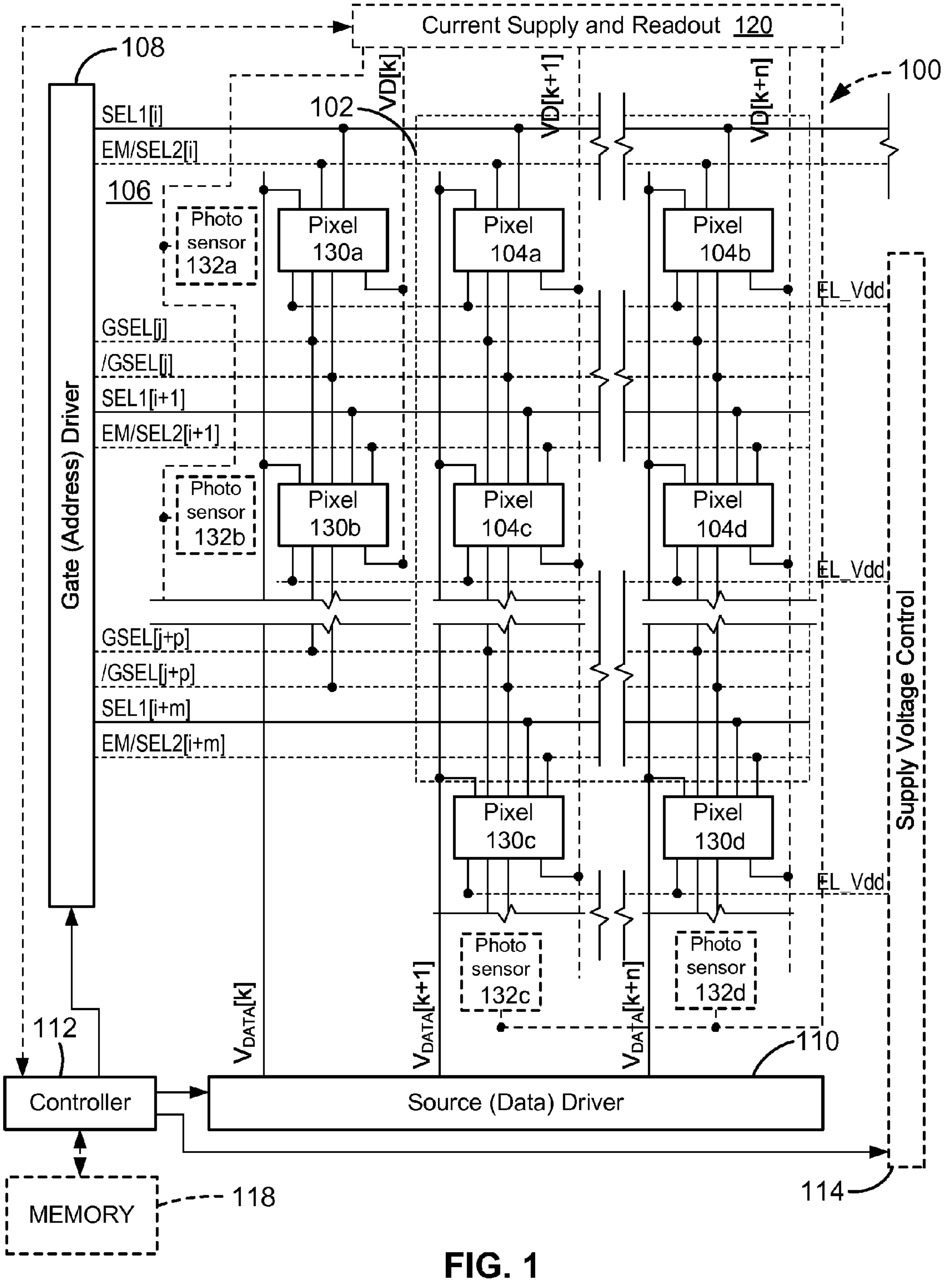
FIG. 1 is a block diagram of an AMOLED display system with compensation control.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is an electronic display system 100 having an active matrix area or pixel array 102 in which an array of active pixels 104 are arranged in a row and column configuration. For ease of illustration, only two rows and columns are shown. External to the active matrix area, which is the pixel array 102, is a peripheral area 106 where peripheral circuitry for driving and controlling the area of the pixel array 102 are disposed. The peripheral circuitry includes a gate or address driver circuit 108, a source or data driver circuit 110, a controller 112, and an optional supply voltage (e.g., EL_Vdd) driver 114. The controller 112 controls the gate, source, and supply voltage drivers 108, 110, 114. The gate driver 108, under control of the controller 112, operates on address or select lines SEL[i], SEL[i+1], and so forth, one for each row of pixels 104 in the pixel array 102. In pixel sharing configurations described below, the gate or address driver circuit 108 can also optionally operate on global select lines GSEL[j] and optionally /GSEL[j], which operate on multiple rows of pixels 104 in the pixel array 102, such as every two rows of pixels 104. The source driver circuit 110, under control of the controller 112, operates on voltage data lines Vdata[k], Vdata[k+1], and so forth, one for each column of pixels 104 in the pixel array 102. The voltage data lines carry voltage programming information to each pixel 104 indicative of brightness of each light emitting device in the pixel 104. A storage element, such as a capacitor, in each pixel 104 stores the voltage programming information until an emission or driving cycle turns on the light emitting device. The optional supply voltage driver 114, under control of the controller 112, controls a supply voltage (EL_Vdd) line, one for each row of pixels 104 in the pixel array 102. The controller 112 is also coupled to a memory 118 that stores various characterization correlation curves and aging parameters of the pixels 104 as will be explained below. The memory 118 may be one or more of a flash memory, an SRAM, a DRAM, combinations thereof, and/or the like.

The display system 100 may also include a current source circuit, which supplies a fixed current on current bias lines. In some configurations, a reference current can be supplied to the current source circuit. In such configurations, a current source control controls the timing of the application of a bias current on the current bias lines. In configurations in which the reference current is not supplied to the current source circuit, a current source address driver controls the timing of the application of a bias current on the current bias lines.

As is known, each pixel 104 in the display system 100 needs to be programmed with information indicating the brightness of the light emitting device in the pixel 104. A frame defines the time period that includes a programming cycle or phase during which each and every pixel in the display system 100 is programmed with a programming voltage indicative of a brightness and a driving or emission cycle or phase during which each light emitting device in each pixel is turned on to emit light at a brightness commensurate with the programming voltage stored in a storage element. A frame is thus one of many still images that compose a complete moving picture displayed on the display system 100. There are at least two schemes for programming and driving the pixels: row-by-row, or frame-by-frame. In row-by-row programming, a row of pixels is programmed and then driven before the next row of pixels is programmed and driven. In frame-by-frame programming, all rows of pixels in the display system 100 are programmed first, and all of the frames are driven row-by-row. Either scheme can employ a brief vertical blanking time at the beginning or end of each period during which the pixels are neither programmed nor driven.

The components located outside of the pixel array 102 may be disposed in a peripheral area 106 around the pixel array 102 on the same physical substrate on which the pixel array 102 is disposed. These components include the gate driver 108, the source driver 110, and the optional supply voltage control 114. Alternately, some of the components in the peripheral area can be disposed on the same substrate as the pixel array 102 while other components are disposed on a different substrate, or all of the components in the peripheral area can be disposed on a substrate different from the substrate on which the pixel array 102 is disposed. Together, the gate driver 108, the source driver 110, and the supply voltage control 114 make up a display driver circuit. The display driver circuit in some configurations may include the gate driver 108 and the source driver 110 but not the supply voltage control 114.

The display system 100 further includes a current supply and readout circuit 120, which reads output data from data output lines, VD [k], VD [k+1], and so forth, one for each column of active pixels 104 in the pixel array 102. A set of optional reference devices such as reference pixels 130 is fabricated on the edge of the pixel array 102 outside the active pixels 104 in the peripheral area 106. The reference pixels 130 also may receive input signals from the controller 112 and may output data signals to the current supply and readout circuit 120. The reference pixels 130 include the drive transistor and an OLED but are not part of the pixel array 102 that displays images. As will be explained below, different groups of reference pixels 130 are placed under different stress conditions via different current levels from the current supply circuit 120. Because the reference pixels 130 are not part of the pixel array 102 and thus do not display images, the reference pixels 130 may provide data indicating the effects of aging at different stress conditions. Although only one row and column of reference pixels 130 is shown in FIG. 1, it is to be understood that there may be any number of reference pixels. Each of the reference pixels 130 in the example shown in FIG. 1 are fabricated next to a corresponding photo sensor 132. The photo sensor 132 is used to determine the luminance level emitted by the corresponding reference pixel 130. It is to be understood that reference devices such as the reference pixels 130 may be a stand alone device rather than being fabricated on the display with the active pixels 104.

Figure 2:
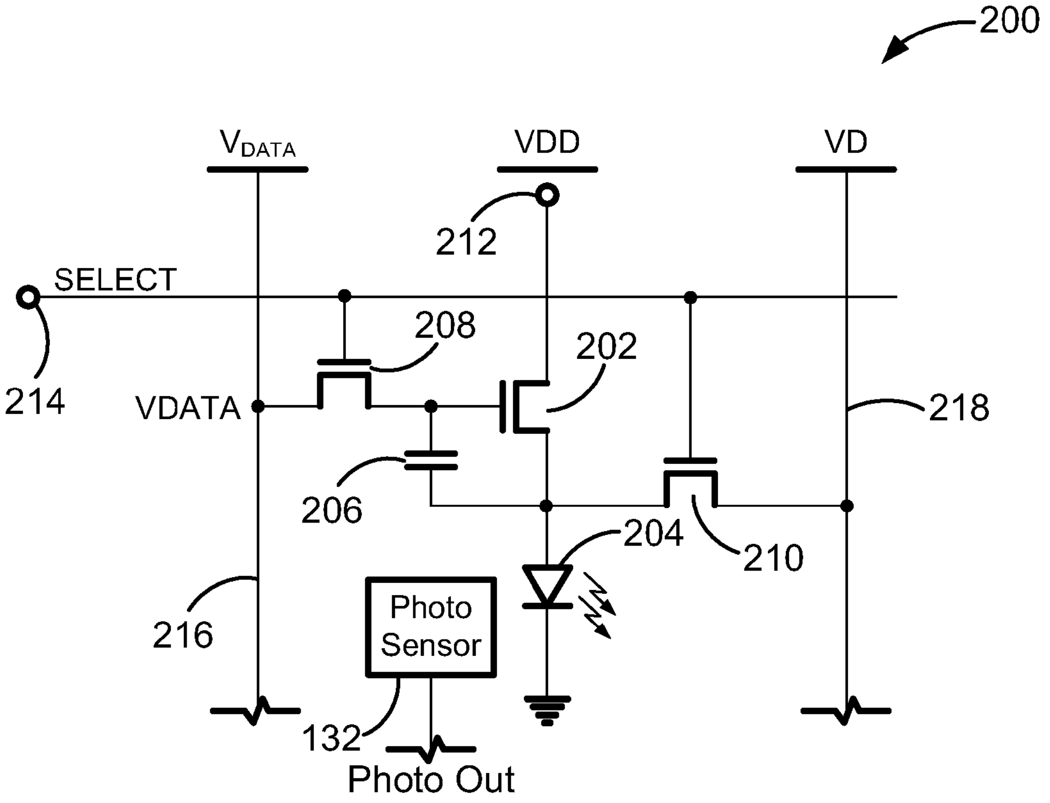
FIG. 2 is a circuit diagram of one of the reference pixels in FIG. 1 for modifying characterization correlation curves based on the measured data.

FIG. 2 shows one example of a driver circuit 200 for one of the example reference pixels 130 in FIG. 1. The driver circuit 200 of the reference pixel 130 includes a drive transistor 202, an organic light emitting device ("OLED") 204, a storage capacitor 206, a select transistor 208 and a monitoring transistor 210. A voltage source 212 is coupled to the drive transistor 202. As shown in FIG. 2, the drive transistor 202 is a thin film transistor in this example that is fabricated from amorphous silicon. A select line 214 is coupled to the select transistor 208 to activate the driver circuit 200. A voltage programming input line 216 allows a programming voltage to be applied to the drive transistor 202. A monitoring line 218 allows outputs of the OLED 204 and/or the drive transistor 202 to be monitored. The select line 214 is coupled to the select transistor 208 and the monitoring transistor 210. During the readout time, the select line 214 is pulled high. A programming voltage may be applied via the programming voltage input line 216. A monitoring voltage may be read from the monitoring line 218 that is coupled to the monitoring transistor 210. The signal to the select line 214 may be sent in parallel with the pixel programming cycle.

The reference pixel 130 may be stressed at a certain current level by applying a constant voltage to the programming voltage input line 216. As will be explained below, the voltage output measured from the monitoring line 218 based on a reference voltage applied to the programming voltage input line 216 allows the determination of electrical characterization data for the applied stress conditions over the time of operation of the reference pixel 130. Alternatively, the monitor line 218 and the programming voltage input line 216 may be merged into one line (i.e., Data/Mon) to carry out both the programming and monitoring functions through that single line. The output of the photo-sensor 132 allows the determination of optical characterization data for stress conditions over the time of operation for the reference pixel 130.

The display system 100 in FIG. 1, according to one exemplary embodiment, in which the brightness of each pixel (or subpixel) is adjusted based on the aging of at least one of the pixels, to maintain a substantially uniform display over the operating life of the system (e.g., 75,000 hours). Non-limiting examples of display devices incorporating the display system 100 include a mobile phone, a digital camera, a personal digital assistant (PDA), a computer, a television, a portable video player, a global positioning system (GPS), etc.

As the OLED material of an active pixel 104 ages, the voltage required to maintain a constant current for a given level through the OLED increases. To compensate for electrical aging of the OLEDs, the memory 118 stores the required compensation voltage of each active pixel to maintain a constant current. It also stores data in the form of characterization correlation curves for different stress conditions that is utilized by the controller 112 to determine compensation voltages to modify the programming voltages to drive each OLED of the active pixels 104 to correctly display a desired output level of luminance by increasing the OLED's current to compensate for the optical aging of the OLED. In particular, the memory 118 stores a plurality of predefined characterization correlation curves or functions, which represent the degradation in luminance efficiency for OLEDs operating under different predetermined stress conditions. The different predetermined stress conditions generally represent different types of stress or operating conditions that an active pixel 104 may undergo during the lifetime of the pixel. Different stress conditions may include constant current requirements at different levels from low to high, constant luminance requirements from low to high, or a mix of two or more stress levels. For example, the stress levels may be at a certain current for some percentage of the time and another current level for another percentage of the time. Other stress levels may be specialized such as a level representing an average streaming video displayed on the display system 100. Initially, the base line electrical and optical characteristics of the reference devices such as the reference pixels 130 at different stress conditions are stored in the memory 118. In this example, the baseline optical characteristic and the baseline electrical characteristic of the reference device are measured from the reference device immediately after fabrication of the reference device.

Each such stress condition may be applied to a group of reference pixels such as the reference pixels 130 by maintaining a constant current through the reference pixel 130 over a period of time, maintaining a constant luminance of the reference pixel 130 over a period of time, and/or varying the current through or luminance of the reference pixel at different predetermined levels and predetermined intervals over a period of time. The current or luminance level(s) generated in the reference pixel 130 can be, for example, high values, low values, and/or average values expected for the particular application for which the display system 100 is intended. For example, applications such as a computer monitor require high values. Similarly, the period(s) of time for which the current or luminance level(s) are generated in the reference pixel may depend on the particular application for which the display system 100 is intended.

It is contemplated that the different predetermined stress conditions are applied to different reference pixels 130 during the operation of the display system 100 in order to replicate aging effects under each of the predetermined stress conditions. In other words, a first predetermined stress condition is applied to a first set of reference pixels, a second predetermined stress condition is applied to a second set of reference pixels, and so on. In this example, the display system 100 has groups of reference pixels 130 that are stressed under 16 different stress conditions that range from a low current value to a high current value for the pixels. Thus, there are 16 different groups of reference pixels 130 in this example. Of course, greater or lesser numbers of stress conditions may be applied depending on factors such as the desired accuracy of the compensation, the physical space in the peripheral area 106, the amount of processing power available, and the amount of memory for storing the characterization correlation curve data.

By continually subjecting a reference pixel or group of reference pixels to a stress condition, the components of the reference pixel are aged according to the operating conditions of the stress condition. As the stress condition is applied to the reference pixel during the operation of the system 100, the electrical and optical characteristics of the reference pixel are measured and evaluated to determine data for determining correction curves for the compensation of aging in the active pixels 104 in the array 102. In this example, the optical characteristics and electrical characteristics are measured once an hour for each group of reference pixels 130. The corresponding characteristic correlation curves are therefore updated for the measured characteristics of the reference pixels 130. Of course, these measurements may be made in shorter periods of time or for longer periods of time depending on the accuracy desired for aging compensation.

Generally, the luminance of the OLED 204 has a direct linear relationship with the current applied to the OLED 204. The optical characteristic of an OLED may be expressed as:

$$L=O*I$$

In this equation, luminance, L, is a result of a coefficient, O, based on the properties of the OLED multiplied by the current I. As the OLED 204 ages, the coefficient O decreases and therefore the luminance decreases for a constant current value. The measured luminance at a given current may therefore be used to determine the characteristic change in the coefficient, O, due to aging for a particular OLED 204 at a particular time for a predetermined stress condition.

The measured electrical characteristic represents the relationship between the voltage provided to the drive transistor 202 and the resulting current through the OLED 204. For example, the change in voltage required to achieve a constant current level through the OLED of the reference pixel may be measured with a voltage sensor or thin film transistor such as the monitoring transistor 210 in FIG. 2. The required voltage generally increases as the OLED 204 and drive transistor 202 ages. The required voltage has a power law relation with the output current as shown in the following equation $$I=k*(V-e)^a$$

In this equation, the current is determined by a constant, k, multiplied by the input voltage, V, minus a coefficient, e, which represents the electrical characteristics of the drive transistor 202. The voltage therefore has a power law relation by the variable, a, to the current, I. As the transistor 202 ages, the coefficient, e, increases thereby requiring greater voltage to produce the same current. The measured current from the reference pixel may therefore be used to determine the value of the coefficient, e, for a particular reference pixel at a certain time for the stress condition applied to the reference pixel.

As explained above, the optical characteristic, O, represents the relationship between the luminance generated by the OLED 204 of the reference pixel 130 as measured by the photo sensor 132 and the current through the OLED 204 in FIG. 2. The measured electrical characteristic, e, represents the relationship between the voltage applied and the resulting current. The change in luminance of the reference pixel 130 at a constant current level from a baseline optical characteristic may be measured by a photo sensor such as the photo sensor 132 in FIG. 1 as the stress condition is applied to the reference pixel. The change in electric characteristics, e, from a baseline electrical characteristic may be measured from the monitoring line to determine the current output. During the operation of the display system 100, the stress condition current level is continuously applied to the reference pixel 130. When a measurement is desired, the stress condition current is removed and the select line 214 is activated. A reference voltage is applied and the resulting luminance level is taken from the output of the photo sensor 132 and the output voltage is measured from the monitoring line 218. The resulting data is compared with previous optical and electrical data to determine changes in current and luminance outputs for a particular stress condition from aging to update the characteristics of the reference pixel at the stress condition. The updated characteristics data is used to update the characteristic correlation curve.

Then by using the electrical and optical characteristics measured from the reference pixel, a characterization correlation curve (or function) is determined for the predetermined stress condition over time. The characterization correlation curve provides a quantifiable relationship between the optical degradation and the electrical aging expected for a given pixel operating under the stress condition. More particularly, each point on the characterization correlation curve determines the correlation between the electrical and optical characteristics of an OLED of a given pixel under the stress condition at a given time where measurements are taken from the reference pixel 130. The characteristics may then be used by the controller 112 to determine appropriate compensation voltages for active pixels 104 that have been aged under the same stress conditions as applied to the reference pixels 130. In another example, the baseline optical characteristic may be periodically measured from a base OLED device at the same time as the optical characteristic of the OLED of the reference pixel is being measured. The base OLED device either is not being stressed or being stressed on a known and controlled rate. This will eliminate any environmental effect on the reference OLED characterization.

Due to manufacturing processes and other factors known to those skilled in the art, each reference pixel 130 of the display system 100 may not have uniform characteristics, resulting in different emitting performances. One technique is to average the values for the electrical characteristics and the values of the luminance characteristics obtained by a set of reference pixels under a predetermined stress condition. A better representation of the effect of the stress condition on an average pixel is obtained by applying the stress condition to a set of the reference pixels 130 and applying a polling-averaging technique to avoid defects, measurement noise, and other issues that can arise during application of the stress condition to the reference pixels. For example, faulty values such as those determined due to noise or a dead reference pixel may be removed from the averaging. Such a technique may have predetermined levels of luminance and electrical characteristics that must be met before inclusion of those values in the averaging. Additional statistical regression techniques may also be utilized to provide less weight to electrical and optical characteristic values that are significantly different from the other measured values for the reference pixels under a given stress condition.

In this example, each of the stress conditions is applied to a different set of reference pixels. The optical and electrical characteristics of the reference pixels are measured, and a polling-averaging technique and/or a statistical regression technique are applied to determine different characterization correlation curves corresponding to each of the stress conditions. The different characterization correlation curves are stored in the memory 118. Although this example uses reference devices to determine the correlation curves, the correlation curves may be determined in other ways such as from historical data or predetermined by a manufacturer.

During the operation of the display system 100, each group of the reference pixels 130 may be subjected to the respective stress conditions and the characterization correlation curves initially stored in the memory 118 may be updated by the controller 112 to reflect data taken from the reference pixels 130 that are subject to the same external conditions as the active pixels 104. The characterization correlation curves may thus be tuned for each of the active pixels 104 based on measurements made for the electrical and luminance characteristics of the reference pixels 130 during operation of the display system 100. The electrical and luminance characteristics for each stress condition are therefore stored in the memory 118 and updated during the operation of the display system 100. The storage of the data may be in a piecewise linear model. In this example, such a piecewise linear model has 16 coefficients that are updated as the reference pixels 130 are measured for voltage and luminance characteristics. Alternatively, a curve may be determined and updated using linear regression or by storing data in a look up table in the memory 118.

To generate and store a characterization correlation curve for every possible stress condition would be impractical due to the large amount of resources (e.g., memory storage, processing power, etc.) that would be required. The disclosed display system 100 overcomes such limitations by determining and storing a discrete number of characterization correlation curves at predetermined stress conditions and subsequently combining those predefined characterization correlation curves using linear or nonlinear algorithm(s) to synthesize a compensation factor for each pixel 104 of the display system 100 depending on the particular operating condition of each pixel. As explained above, in this example there are a range of 16 different predetermined stress conditions and therefore 16 different characterization correlation curves stored in the memory 118.

For each pixel 104, the display system 100 analyzes the stress condition being applied to the pixel 104, and determines a compensation factor using an algorithm based on the predefined characterization correlation curves and the measured electrical aging of the panel pixels. The display system 100 then provides a voltage to the pixel based on the compensation factor. The controller 112 therefore determines the stress of a particular pixel 104 and determines the closest two predetermined stress conditions and attendant characteristic data obtained from the reference pixels 130 at those predetermined stress conditions for the stress condition of the particular pixel 104. The stress condition of the active pixel 104 therefore falls between a low predetermined stress condition and a high predetermined stress condition.

The following examples of linear and nonlinear equations for combining characterization correlation curves are described in terms of two such predefined characterization correlation curves for ease of disclosure; however, it is to be understood that any other number of predefined characterization correlation curves can be utilized in the exemplary techniques for combining the characterization correlation curves. The two exemplary characterization correlation curves include a first characterization correlation curve determined for a high stress condition and a second characterization correlation curve determined for a low stress condition.

Figure 3:
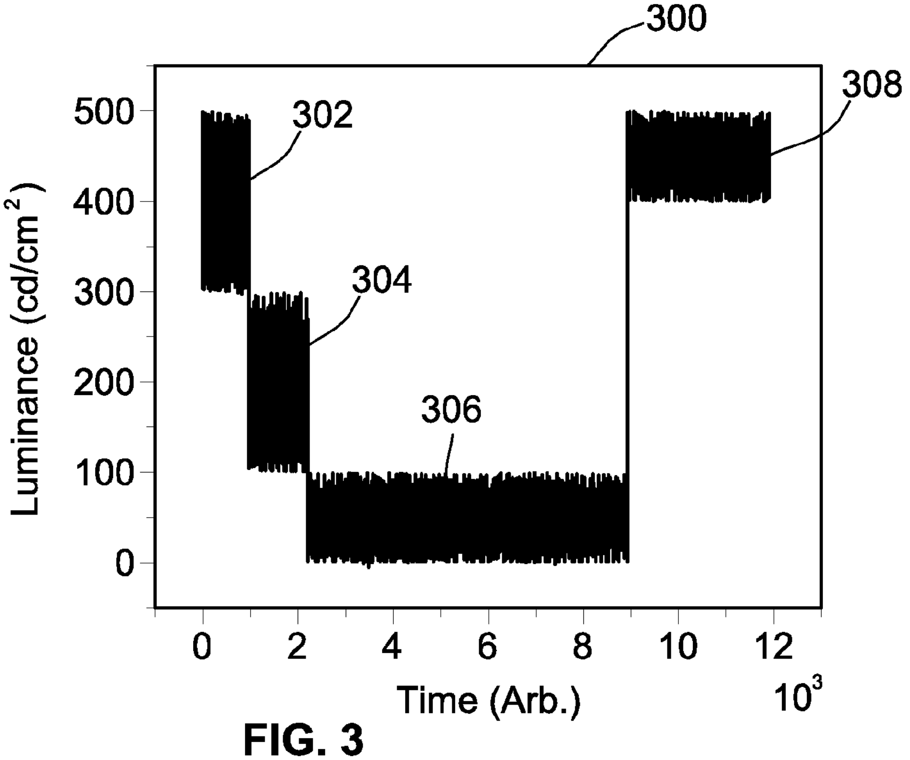
FIG. 3 is a graph of luminance emitted from an active pixel reflecting the different levels of stress conditions over time that may require different compensation.

The ability to use different characterization correlation curves over different levels provides accurate compensation for active pixels 104 that are subjected to different stress conditions than the predetermined stress conditions applied to the reference pixels 130. FIG. 3 is a graph showing different stress conditions over time for an active pixel 104 that shows luminance levels emitted over time. During a first time period, the luminance of the active pixel is represented by trace 302, which shows that the luminance is between 300 and 500 nits ($cd/cm^2$). The stress condition applied to the active pixel during the trace 302 is therefore relatively high. In a second time period, the luminance of the active pixel is represented by a trace 304, which shows that the luminance is between 300 and 100 nits. The stress condition during the trace 304 is therefore lower than that of the first time period and the age effects of the pixel during this time differ from the higher stress condition. In a third time period, the luminance of the active pixel is represented by a trace 306, which shows that the luminance is between 100 and 0 nits. The stress condition during this period is lower than that of the second period. In a fourth time period, the luminance of the active pixel is represented by a trace 308 showing a return to a higher stress condition based on a higher luminance between 400 and 500 nits.

The limited number of reference pixels 130 and corresponding limited numbers of stress conditions may require the use of averaging or continuous (moving) averaging for the specific stress condition of each active pixel 104. The specific stress conditions may be mapped for each pixel as a linear combination of characteristic correlation curves from several reference pixels 130. The combinations of two characteristic curves at predetermined stress conditions allow accurate compensation for all stress conditions occurring between such stress conditions. For example, the two reference characterization correlation curves for high and low stress conditions allow a close characterization correlation curve for an active pixel having a stress condition between the two reference curves to be determined. The first and second reference characterization correlation curves stored in the memory 118 are combined by the controller 112 using a weighted moving average algorithm. A stress condition at a certain time St $(t_i)$ for an active pixel may be represented by:

$$St(t_i)=(St(t_{i-1})*k_{avg}+L(t_i))/(k_{avg}+1)$$

In this equation, $St(t_{i-1})$ is the stress condition at a previous time, $k_{avg}$ is a moving average constant. $L(t_i)$ is the measured luminance of the active pixel at the certain time, which may be determined by:

$$L(t_i) = L_{peak}\left(\frac{g(t_i)}{g_{peak}}\right)^{\gamma}$$

In this equation, $L_{peak}$ is the highest luminance permitted by the design of the display system 100. The variable, $g(t_i)$ is the grayscale at the time of measurement, $g_{peak}$ is the highest grayscale value of use (e.g. 255) and $\gamma$ is a gamma constant. A weighted moving average algorithm using the characterization correlation curves of the predetermined high and low stress conditions may determine the compensation factor, $K_{comp}$, via the following equation:

$$K_{comp}=K_{high}f_{high}(\Delta I)+K_{low}f_{low}(\Delta I)$$

In this equation, $f_{high}$ is the first function corresponding to the characterization correlation curve for a high predetermined stress condition and $f_{low}$ is the second function corresponding to the characterization correlation curve for a low predetermined stress condition. ΔI is the change in the current in the OLED for a fixed voltage input, which shows the change (electrical degradation) due to aging effects measured at a particular time. It is to be understood that the change in current may be replaced by a change in voltage, ΔV, for a fixed current. $K_{high}$ is the weighted variable assigned to the characterization correlation curve for the high stress condition and $K_{low}$ is the weight assigned to the characterization correlation curve for the low stress condition. The weighted variables $K_{high}$ and $K_{low}$ may be determined from the following equations:

$$K_{high}=St(t_i)/L_{high}$$

$$K_{low}=1-K_{high}$$

Where $L_{high}$ is the luminance that was associated with the high stress condition.

The change in voltage or current in the active pixel at any time during operation represents the electrical characteristic while the change in current as part of the function for the high or low stress condition represents the optical characteristic. In this example, the luminance at the high stress condition, the peak luminance, and the average compensation factor (function of difference between the two characterization correlation curves), $K_{avg}$, are stored in the memory 118 for determining the compensation factors for each of the active pixels. Additional variables are stored in the memory 118 including, but not limited to, the grayscale value for the maximum luminance permitted for the display system 100 (e.g., grayscale value of 255). Additionally, the average compensation factor, $K_{avg}$, may be empirically determined from the data obtained during the application of stress conditions to the reference pixels.

As such, the relationship between the optical degradation and the electrical aging of any pixel 104 in the display system 100 may be tuned to avoid errors associated with divergence in the characterization correlation curves due to different stress conditions. The number of characterization correlation curves stored may also be minimized to a number providing confidence that the averaging technique will be sufficiently accurate for required compensation levels.

The compensation factor, $K_{comp}$ can be used for compensation of the OLED optical efficiency aging for adjusting programming voltages for the active pixel. Another technique for determining the appropriate compensation factor for a stress condition on an active pixel may be termed dynamic moving averaging. The dynamic moving averaging technique involves changing the moving average coefficient, $K_{avg}$, during the lifetime of the display system 100 to compensate between the divergence in two characterization correlation curves at different predetermined stress conditions in order to prevent distortions in the display output. As the OLEDs of the active pixels age, the divergence between two characterization correlation curves at different stress conditions increases. Thus, $K_{avg}$ may be increased during the lifetime of the display system 100 to avoid a sharp transition between the two curves for an active pixel having a stress condition falling between the two predetermined stress conditions. The measured change in current, ΔI , may be used to adjust the $K_{avg}$ value to improve the performance of the algorithm to determine the compensation factor.

Another technique to improve performance of the compensation process termed event-based moving averaging is to reset the system after each aging step. This technique further improves the extraction of the characterization correlation curves for the OLEDs of each of the active pixels 104. The display system 100 is reset after every aging step (or after a user turns on or off the display system 100). In this example, the compensation factor, $K_{comp}$ is determined by $$K_{comp}=K_{comp\_evt}+K_{high}(f_{high}(\Delta I)-f_{high}(\Delta I_{evt}))+K_{low}(f_{low}(\Delta I)-f_{low}(\Delta I))$$

In this equation, $K_{comp\_evt}$ is the compensation factor calculated at a previous time, and $\Delta I_{evt}$ is the change in the OLED current during the previous time at a fixed voltage. As with the other compensation determination technique, the change in current may be replaced with the change in an OLED voltage change under a fixed current.

Figure 4:
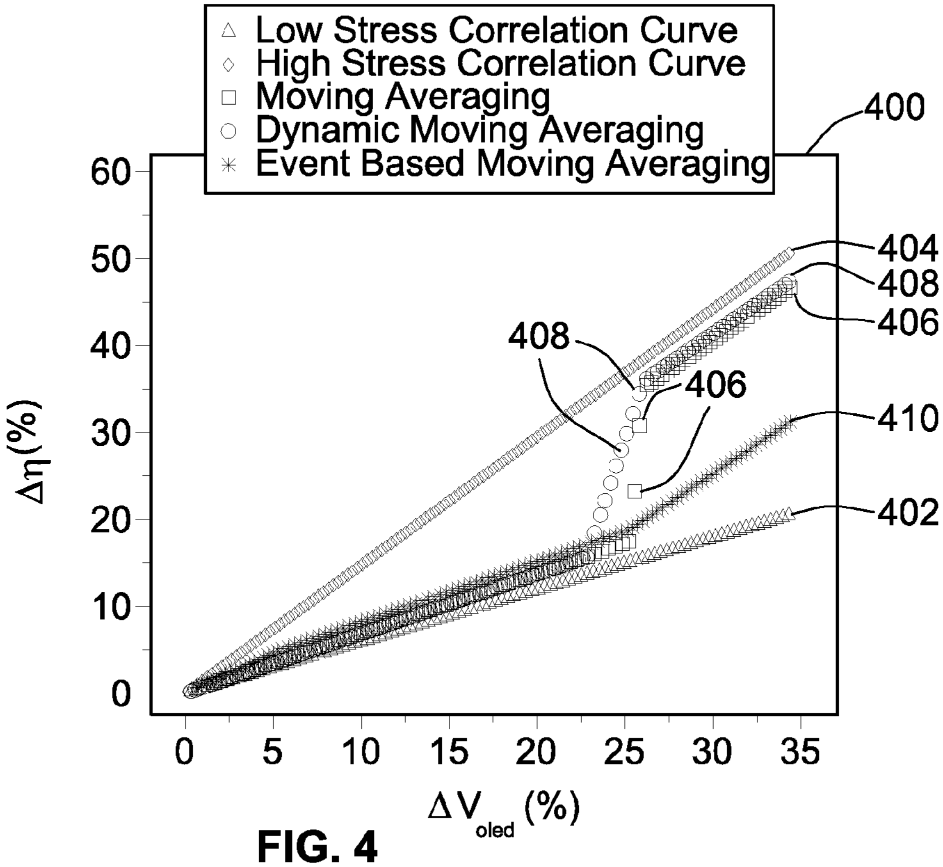
FIG. 4 is a graph of the plots of different characterization correlation curves and the results of techniques of using predetermined stress conditions to determine compensation.

FIG. 4 is a graph 400 showing the different characterization correlation curves based on the different techniques. The graph 400 compares the change in the optical compensation percent and the change in the voltage of the OLED of the active pixel required to produce a given current. As shown in the graph 400, a high stress predetermined characterization correlation curve 402 diverges from a low stress predetermined characterization correlation curve 404 at greater changes in voltage reflecting aging of an active pixel. A set of points 406 represents the correction curve determined by the moving average technique from the predetermined characterization correlation curves 402 and 404 for the current compensation of an active pixel at different changes in voltage. As the change in voltage increases reflecting aging, the transition of the correction curve 406 has a sharp transition between the low characterization correlation curve 404 and the high characterization correlation curve 402. A set of points 408 represents the characterization correlation curve determined by the dynamic moving averaging technique. A set of points 410 represents the compensation factors determined by the event-based moving averaging technique. Based on OLED behavior, one of the above techniques can be used to improve the compensation for OLED efficiency degradation.

As explained above, an electrical characteristic of a first set of sample pixels is measured. For example, the electrical characteristic of each of the first set of sample pixels can be measured by a thin film transistor (TFT) connected to each pixel. Alternatively, for example, an optical characteristic (e.g., luminance) can be measured by a photo sensor provided to each of the first set of sample pixels. The amount of change required in the brightness of each pixel can be extracted from the shift in voltage of one or more of the pixels. This may be implemented by a series of calculations to determine the correlation between shifts in the voltage or current supplied to a pixel and/or the brightness of the light-emitting material in that pixel.

The above described methods of extracting characteristic correlation curves for compensating aging of the pixels in the array may be performed by a processing device such as the controller 112 in FIG. 1 or another such device, which may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

In addition, two or more computing systems or devices may be substituted for any one of the controllers described herein. Accordingly, principles and advantages of distributed processing, such as redundancy, replication, and the like, also can be implemented, as desired, to increase the robustness and performance of controllers described herein.

The operation of the example characteristic correlation curves for compensating aging methods may be performed by machine readable instructions. In these examples, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the characteristic correlation curves for compensating aging methods could be implemented by software, hardware, and/or firmware. Also, some or all of the machine readable instructions represented may be implemented manually.

Figure 5:
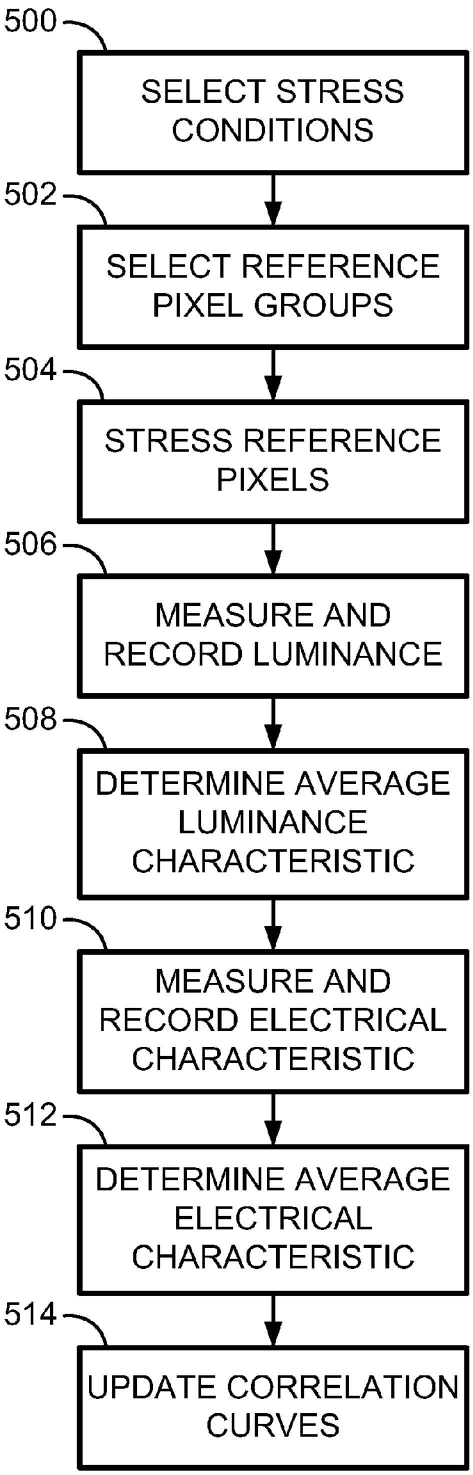
FIG. 5 is a flow diagram of the process of determining and updating characterization correlation curves based on groups of reference pixels under predetermined stress conditions.

FIG. 5 is a flow diagram of a process to determine and update the characterization correlation curves for a display system such as the display system 100 in FIG. 1. A selection of stress conditions is made to provide sufficient baselines for correlating the range of stress conditions for the active pixels (500). A group of reference pixels is then selected for each of the stress conditions (502). The reference pixels for each of the groups corresponding to each of the stress conditions are then stressed at the corresponding stress condition and base line optical and electrical characteristics are stored (504). At periodic intervals the luminance levels are measured and recorded for each pixel in each of the groups (506). The luminance characteristic is then determined by averaging the measured luminance for each pixel in the group of the pixels for each of the stress conditions (508). The electrical characteristics for each of the pixels in each of the groups are determined (510). The average of each pixel in the group is determined to determine the average electrical characteristic (512). The average luminance characteristic and the average electrical characteristic for each group are then used to update the characterization correlation curve for the corresponding predetermined stress condition (514). Once the correlation curves are determined and updated, the controller may use the updated characterization correlation curves to compensate for aging effects for active pixels subjected to different stress conditions.

Figure 6:
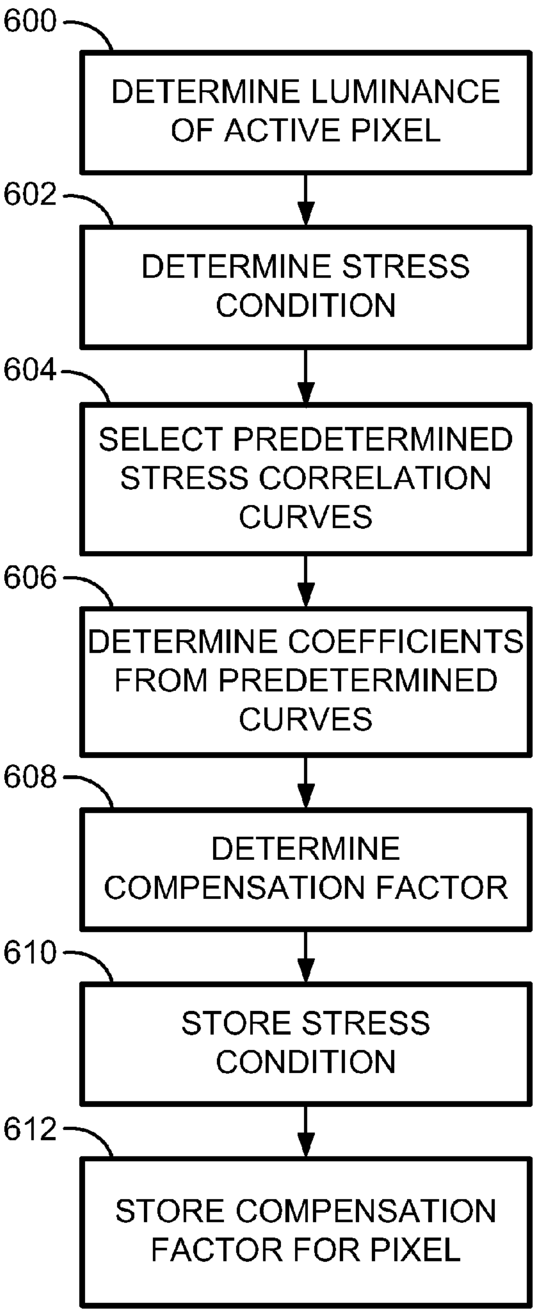
FIG. 6 is a flow diagram of the process of compensating the programming voltages of active pixels on a display using predetermined characterization correlation curves.

Referring to FIG. 6, a flowchart is illustrated for a process of using appropriate predetermined characterization correlation curves for a display system 100 as obtained in the process in FIG. 5 to determine the compensation factor for an active pixel at a given time. The luminance emitted by the active pixel is determined based on the highest luminance and the programming voltage (600). A stress condition is measured for a particular active pixel based on the previous stress condition, determined luminance, and the average compensation factor (602). The appropriate predetermined stress characterization correlation curves are read from memory (604). In this example, the two characterization correlation curves correspond to predetermined stress conditions that the measured stress condition of the active pixel falls between. The controller 112 then determines the coefficients from each of the predetermined stress conditions by using the measured current or voltage change from the active pixel (606). The controller then determines a modified coefficient to calculate a compensation voltage to add to the programming voltage to the active pixels (608). The determined stress condition is stored in the memory (610). The controller 112 then stores the new compensation factor, which may then be applied to modify the programming voltages to the active pixel during each frame period after the measurements of the reference pixels 130 (612).

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method for determining a characterization correlation curve for aging compensation for an organic light emitting device (OLED) based pixel in a display comprising:
- applying a first stress condition to a reference device;
- storing a baseline optical characteristic and a baseline electrical characteristic of the reference device;
- periodically measuring an output voltage based on a reference current to determine an electrical characteristic of the reference device;
- periodically measuring the luminance of the reference device to determine an optical characteristic of the reference device;
- determining a characterization correlation curve corresponding to the first stress condition based on the baseline optical and electrical characteristics and the determined electrical and optical characteristics of the reference device; and
- storing the characterization correlation curve corresponding to the first stress condition.

2. The method of claim 1, wherein the reference device is a pixel including an OLED and a drive transistor, and the baseline electrical characteristic is determined from measuring a property of the drive transistor and the OLED.

3. The method of claim 2, further comprising:
- applying the first stress condition to a plurality of reference pixels each having a drive transistor and an OLED;
- periodically measuring an output voltage based on a reference current to determine an electrical characteristic of each of the reference pixels;
- periodically measuring the luminance of each of the reference pixels to determine an optical characteristic of each of the reference pixels; and
- averaging the electrical and optical characteristics of each of the plurality of reference pixels to determine the characterization correlation curve.

4. The method of claim 1, further comprising:

applying a second stress condition to a second reference pixel having an OLED;

storing a baseline optical characteristic and a baseline electrical characteristic of the second reference pixel;

periodically measuring an output voltage based on a reference current to determine an electrical characteristic of the second reference pixel;

periodically measuring the luminance of the reference pixel to determine an optical characteristic of the second reference pixel;

determining a second characterization correlation curve corresponding to the second stress condition based on the baseline optical and electrical characteristics and the determined electrical and optical characteristic of the second reference pixel; and storing the second characterization correlation curve corresponding to the second stress condition.

5. The method of claim 4, further comprising:

determining a stress condition on an active pixel on a display, the stress condition falling between the first and second stress condition;

determining a compensation factor as a function of the first and second characterization correlation curves corresponding to the first and second reference pixels; and modifying a programming voltage by the compensation factor to the active pixel to compensate for aging effects.

6. A method for determining a characterization correlation curve for aging compensation for an organic light emitting device (OLED) based pixel in a display comprising:

applying a first stress condition to a reference device;

storing a baseline optical characteristic and a baseline electrical characteristic of the reference device;

periodically measuring an output voltage based on a reference current to determine an electrical characteristic of the reference device;

periodically measuring the luminance of the reference pixel to determine an optical characteristic of the reference device;

determining a characterization correlation curve corresponding to the first stress condition based on the baseline optical and electrical characteristics and the determined electrical and optical characteristics of the reference device;

storing the characterization correlation curve corresponding to the first stress condition applying a second stress condition to a second reference pixel having an OLED;

storing a baseline optical characteristic and a baseline electrical characteristic of the second reference pixel;

periodically measuring an output voltage based on a reference current to determine an electrical characteristic of the second reference pixel;

periodically measuring the luminance of the reference pixel to determine an optical characteristic of the second reference pixel;

determining a second characterization correlation curve corresponding to the second stress condition based on the baseline optical and electrical characteristics and the determined electrical and optical characteristic of the second reference pixel;

storing the second characterization correlation curve corresponding to the second stress condition;

determining a stress condition on an active pixel on a display, the stress condition falling between the first and second stress condition;

determining a compensation factor as a function of the first and second characterization correlation curves corresponding to the first and second reference pixels; and modifying a programming voltage by the compensation factor to the active pixel to compensate for aging effects;

wherein the compensation factor is determined based on a previous determined stress condition on the active pixel multiplied by an average compensation factor, the average compensation factor being a function of the difference between the first and second characterization correlation curves.

7. The method of claim 1, wherein the baseline optical characteristic and the baseline electrical characteristic of the reference device are measured from the reference device immediately after fabrication of the reference device.

8. The method of claim 1, wherein the baseline optical characteristic and the baseline electrical characteristic of the reference device are determined from periodic measurement of a base device.

9. The method of claim 1, wherein the luminance characteristic is measured by a photo sensor in proximity to the reference pixel.

10. A display system for compensating of aging effects, the display system comprising:

a plurality of active pixels displaying an image, the active pixels each including a drive transistor and an organic light emitting diode (OLED);

a memory storing a first characterization correlation curve for a first predetermined stress condition and a second characterization correlation curve for a second predetermined stress condition; and a controller coupled to the plurality of active pixels, the controller determining a stress condition on one of the active pixels, the stress condition falling between the first and second predetermined stress conditions, and determining a compensation factor to apply to a programming voltage based on the characterization correlation curves of the first and second stress conditions.

11. A display system for compensating of aging effects, the display system comprising:

a plurality of active pixels displaying an image, the active pixels each including a drive transistor and an organic light emitting diode (OLED);

a memory storing a first characterization correlation curve for a first predetermined stress condition and a second characterization correlation curve for a second predetermined stress condition;

a controller coupled to the plurality of active pixels, the controller determining a stress condition on one of the active pixels, the stress condition falling between the first and second predetermined stress conditions, and determining a compensation factor to apply to a programming voltage based on the characterization correlation curves of the first and second stress conditions;

a first reference pixel including a drive transistor and an OLED;

a second reference pixel including a drive transistor and an OLED; and wherein the first characterization correlation curve is determined based on electrical and optical characteristics determined from the first reference pixel under the first stress condition and the second characterization correlation curve determined based on electrical and optical characteristics determined from the second reference pixel under the second stress condition.

12. The display system of claim 10, wherein the compensation factor is determined by dynamic moving averaging by adjusting the coefficient as a function of the age of the active pixel.

13. The display system of claim 10, wherein the compensation factor is determined by the compensation factor determined at a previous time period and the electrical change from the current stress condition applied to the predetermined characterization correlation curves.

14. A method of determining a characterization correlation curve for an OLED device in a display, the method comprising:

storing a first characterization correlation curve based on a first group of reference pixels at a predetermined high stress condition;

storing a second characterization correlation curve based on a second group of reference pixels at a predetermined low stress condition;

determining a stress level of an active pixel falling between the high and low stress conditions;

determining a compensation factor based on the stress on the active pixel, the compensation factor based on the stress on the active pixel and the first and second characterization correlation curve; and adjusting a programming voltage to the active pixel based on the compensation factor.

15. The method of claim 14, wherein the first characterization correlation curve is determined based on averaging the characteristics of the first group of reference pixels.

16. The method of claim 14, wherein the compensation factor is determined based on a previous determined stress condition on the active pixel multiplied by an average compensation factor, the average compensation factor being a function of the difference between the first and second characterization correlation curves.

17. The method of claim 14, wherein the average compensation factor is increased as a function of time.

18. The method of claim 14, wherein the compensation factor is determined based on a previously determined compensation factor.

19. A display system for compensating for aging effects, the display system comprising:

a plurality of active pixels for displaying an image, the active pixels each including a drive transistor and an organic light emitting diode (OLED);

a memory storing a first characterization correlation curve for a first predetermined stress condition and a second characterization correlation curve for a second predetermined stress condition; and a controller coupled to the plurality of active pixels, the controller determining a stress condition of a selected one of the active pixels, the stress condition falling between the first and second predetermined stress conditions, and determining a compensation factor to apply to a programming voltage for said selected active pixel, based on a weighted moving average of said first and second characterization correlation curves of said first and second predetermined stress conditions.

20. A display system for compensating for aging effects, the display system comprising:

a plurality of active pixels displaying an image, the active pixels each including a drive transistor and an organic light emitting diode (OLED);

a memory storing a first characterization correlation curve for a first predetermined stress condition and a second characterization correlation curve for a second predetermined stress condition; and a controller coupled to the plurality of active pixels, the controller determining a stress condition of a selected one of the active pixels, the stress condition falling between the first and second predetermined stress conditions, and determining a compensation factor to apply to a programming voltage for said selected active pixel, based on a weighted moving average of said first and second characterization correlation curves of said first and second predetermined stress conditions;

wherein said stress condition for an active pixel at a time $t_i$ is $St(t_i)=(St(t_{i-1})*k_{avg}+L(t_i))/(k_{avg}+1)$, where $St(t_{i-1})$ is the stress condition at a previous time, $k_{avg}$ is a moving average constant, $L(t_i)$ is the measured luminance of the active pixel at time $t_i$.

21. A display system for compensating for aging effects, the display system comprising:

a plurality of active pixels displaying an image, the active pixels each including a drive transistor and an organic light emitting diode (OLED);

a memory storing a first characterization correlation curve for a first predetermined stress condition and a second characterization correlation curve for a second predetermined stress condition; and a controller coupled to the plurality of active pixels, the controller determining a stress condition of a selected one of the active pixels, the stress condition falling between the first and second predetermined stress conditions, determining a compensation factor to apply to a programming voltage for said selected active pixel, based on a weighted moving average of said first and second characterization correlation curves of said first and second predetermined stress conditions, and determining the two predetermined stress conditions closest to said determined stress condition of said selected one of the active pixels and attendant characteristic data obtained from said reference pixels at said closest two predetermined stress conditions.

* * * * *